United States Patent
Locke et al.

(10) Patent No.: US 9,632,995 B2
(45) Date of Patent: Apr. 25, 2017

(54) METHOD AND APPARATUS FOR NAVIGATING THROUGH A TASK ON A COMPUTER

(75) Inventors: Brian Stanley Locke, Lee, NH (US); Gail M. Breck, Milton, NH (US); David Alexander Brousseau, Barrington, NH (US); Ronald S. Fitzpatrick, Jr., Center Barnstead, NH (US); Paul Playdon, Rochester, NH (US); Kiet H. Tran, Somersworth, NH (US); Kevin Allen White, Somersworth, NH (US)

(73) Assignee: EXTREME NETWORKS, INC., San Jose, CA (US)

( * ) Notice: Subject to any disclaimer, the term of this patent is extended or adjusted under 35 U.S.C. 154(b) by 268 days.

(21) Appl. No.: 10/717,838

(22) Filed: Nov. 20, 2003

(65) Prior Publication Data

US 2004/0104939 A1 Jun. 3, 2004

Related U.S. Application Data

(60) Provisional application No. 60/428,578, filed on Nov. 22, 2002.

(51) Int. Cl.
*G06F 17/24* (2006.01)
*G06F 9/445* (2006.01)
(Continued)

(52) U.S. Cl.
CPC .......... *G06F 17/243* (2013.01); *G06F 3/0482* (2013.01); *G06F 8/61* (2013.01); *G06F 9/44505* (2013.01); *G06Q 10/06316* (2013.01)

(58) Field of Classification Search
CPC ...... G06F 8/61; G06F 9/44505; G06F 17/243; G06F 3/0482; Y10S 715/965; G06Q 10/06316
(Continued)

(56) References Cited

U.S. PATENT DOCUMENTS 4,646,250 A * 2/1987 Childress ...................... 715/507
5,301,326 A * 4/1994 Linnett et al. ................ 719/320
(Continued)

OTHER PUBLICATIONS

Engst, Adam C.; "Visual QuickStart Guide—Eudora for Windows & Macintosh;" 1997; Peachpit Press; ISBN: 0-201-69663-0; pp. 1-13 and 176.*
(Continued)

*Primary Examiner* — Eric Wiener
(74) *Attorney, Agent, or Firm* — Ropes & Gray LLP

(57) ABSTRACT

Assisting a user to navigate through a performance of a task, the task including a plurality of sub-tasks. Two or more of the sub-tasks are serially presented on a graphical user interface. Each of the two or more sub-tasks is displayed in a respective area of the graphical user interface. For each of the two or more sub-tasks, the user is enabled to perform the sub-task by entering information into the respective area of the sub-task as the sub-task is presented. While the two or more sub-tasks are being presented, a sub-task list of items is displayed to the user on the graphical user interface. Each item represents a respective one of the plurality of sub-tasks. Displaying the sub-task list includes displaying, within at least one of the items, information corresponding to the sub-task represented by the at least one item.

24 Claims, 14 Drawing Sheets

US 9,632,995 B2
Page 2

(51) Int. Cl.
*G06F 3/0482* (2013.01)
*G06Q 10/06* (2012.01)

(58) Field of Classification Search
USPC .................................................. 345/705, 764
See application file for complete search history.

(56) References Cited

U.S. PATENT DOCUMENTS

| | | | | |
|---|---|---|---|---|
| 5,367,635 | A * | 11/1994 | Bauer et al. .................. | 709/221 |
| 5,450,545 | A * | 9/1995 | Martin et al. .................. | 717/109 |
| 5,859,637 | A * | 1/1999 | Tidwell, II .................... | 715/708 |
| 5,917,489 | A * | 6/1999 | Thurlow et al. ............. | 715/809 |
| 5,918,016 | A * | 6/1999 | Brewer et al. ................ | 709/220 |
| 5,924,101 | A * | 7/1999 | Bach et al. ............... | 707/103 R |
| 5,940,294 | A * | 8/1999 | Dove .............................. | 700/83 |
| 6,053,951 | A * | 4/2000 | McDonald et al. ............. | 7/109 |
| 6,104,393 | A * | 8/2000 | Santos-Gomez ............ | 715/763 |
| 6,115,720 | A * | 9/2000 | Bleizeffer et al. ........... | 707/201 |
| 6,128,622 | A * | 10/2000 | Bach et al. ............... | 707/103 R |
| 6,202,206 | B1* | 3/2001 | Dean et al. .................... | 717/177 |
| 6,219,046 | B1* | 4/2001 | Thomas et al. ............... | 715/708 |
| 6,233,726 | B1* | 5/2001 | Bowman et al. ............. | 717/107 |
| 6,263,352 | B1* | 7/2001 | Cohen .......................... | 715/206 |
| 6,285,998 | B1* | 9/2001 | Black et al. ................... | 707/4 |
| 6,286,137 | B1* | 9/2001 | Bleizeffer et al. ........... | 717/127 |
| 6,300,948 | B1* | 10/2001 | Geller et al. .................. | 715/866 |
| 6,307,544 | B1* | 10/2001 | Harding ........................ | 715/709 |
| 6,307,925 | B1* | 10/2001 | Bailis et al. .................. | 379/136 |
| 6,377,283 | B1* | 4/2002 | Thomas ........................ | 715/762 |
| 6,489,980 | B1* | 12/2002 | Scott et al. .................... | 715/854 |
| 6,502,234 | B1* | 12/2002 | Gauthier et al. .............. | 717/107 |
| 6,564,375 | B1* | 5/2003 | Jiang ............................. | 717/165 |
| 6,574,791 | B1* | 6/2003 | Gauthier et al. .............. | 717/107 |
| 6,591,295 | B1* | 7/2003 | Diamond et al. ............. | 709/217 |
| 6,621,505 | B1* | 9/2003 | Beauchamp et al. ......... | 715/764 |
| 6,910,208 | B1* | 6/2005 | Zimniewicz .................. | 717/174 |
| 6,934,913 | B2* | 8/2005 | Le et al. ........................ | 715/750 |
| 6,965,889 | B2* | 11/2005 | Serrano-Morales et al. ..... | 707/1 |
| 7,000,187 | B2* | 2/2006 | Messinger et al. ........... | 715/705 |
| 7,159,206 | B1* | 1/2007 | Sadhu et al. .................. | 717/101 |
| 7,181,500 | B2* | 2/2007 | Jen et al. ....................... | 709/217 |
| 7,213,212 | B2* | 5/2007 | Bybee et al. .................. | 715/760 |
| 7,284,043 | B2* | 10/2007 | Feinleib et al. ............... | 709/220 |
| 7,340,679 | B2* | 3/2008 | Botscheck et al. ........... | 715/738 |
| 2002/0055928 | A1* | 5/2002 | Worthington ................. | 707/102 |
| 2002/0101448 | A1* | 8/2002 | Sanderson ..................... | 345/762 |
| 2002/0120506 | A1* | 8/2002 | Hagen ........................... | 705/14 |
| 2002/0174420 | A1* | 11/2002 | Kumar .......................... | 717/174 |
| 2003/0038841 | A1* | 2/2003 | Vazquez et al. .............. | 345/762 |
| 2003/0081002 | A1* | 5/2003 | De Vorchik et al. ......... | 345/762 |
| 2003/0125815 | A1* | 7/2003 | Ghanime et al. ............. | 700/1 |
| 2003/0222908 | A1* | 12/2003 | Bybee et al. .................. | 345/749 |
| 2003/0229884 | A1* | 12/2003 | Carr et al. ..................... | 717/101 |
| 2004/0098313 | A1* | 5/2004 | Agrawal et al. ............... | 705/26 |
| 2004/0135802 | A1* | 7/2004 | Allor ............................. | 345/705 |
| 2004/0254922 | A1* | 12/2004 | Vincent, III .................. | 707/3 |
| 2004/0254953 | A1* | 12/2004 | Vincent, III ............. | 707/103 Y |
| 2004/0268240 | A1* | 12/2004 | Vincent, III .................. | 715/513 |
| 2005/0138558 | A1* | 6/2005 | Duevel et al. ................ | 715/700 |
| 2005/0240900 | A1* | 10/2005 | Krebs ............................ | 717/110 |
| 2005/0268280 | A1* | 12/2005 | Fildebrandt .................. | 717/113 |
| 2006/0004725 | A1* | 1/2006 | Abraido-Fandino ........... | 707/3 |
| 2006/0020619 | A1* | 1/2006 | Netz et al. ..................... | 707/102 |
| 2006/0075407 | A1* | 4/2006 | Powers et al. ................ | 718/100 |
| 2006/0259730 | A1* | 11/2006 | Gimpl et al. .................. | 711/173 |

OTHER PUBLICATIONS

Block Financial *TaxCut 2002 Installation* [compact disc] 2002.
Block Financial *TaxCut 2002 Installation* [screenshots from Installation of Program] 25 pp. 2002.
Enterasys Networks, Inc. *Netsight Atlas Installation* Guide pp. 1-6 (prior to Nov. 13, 2003).
Intuit, Inc. *Making the Most of Your Money with Quicken Deluxe 2000* pp. 1-92, 1999.
Intuit, Inc. *Turbotax: Tax Year 2002 Federal Return V2002.01 D* [compact diskette] 2002.
Intuit, Inc. *Turbotax: Tax Year 2002 Federal Return V2002.01 D* [screenshots from Installation of Program] 5 pp. 2002.
Sun Microsystems, Inc. *Solaris 8 (Intel Platform Edition) Installation Guide*. pp. 1-232, 2000.
Zero G. Software, Inc. *InstallAnywhere 6* pp. 1-113 (1997-2003).
Microsoft Corporation, *Microsoft Windows 2000 Professional: Windows Installer Services Overview*, pp. 1-15, 1999, Microsoft Corporation.
Microsoft Corporation, *Microsoft Windows: Windows Installer: Benefits and Implementation for System Administrators*, pp. 1-91, Nov. 2001, Microsoft Corporation.

* cited by examiner

METHOD AND APPARATUS FOR NAVIGATING THROUGH A TASK ON A COMPUTER

RELATED APPLICATIONS

This application claims the benefit under 35 U.S.C. §119(e) to commonly-owned U.S. provisional patent application Ser. No. 60/428,578, titled NON-LINEAR SUMMARY WIZARD, filed on Nov. 22, 2002, which is hereby incorporated by reference in its entirety.

BACKGROUND

Computers often are programmed to automate or semi-automate a task that traditionally has been performed by one or more persons. Such tasks may include filling out an electronic form, installing an application, electronic registration, defining objects, shopping on-line, on-line banking, preparing tax forms, and the like. Such automation or semi-automation typically provides the benefit of saving time and cost in performing the task, particularly if the task is to be performed repetitively, and often increases the accuracy in performing the task. These benefits may increase as the complexity of the task being performed increases, e.g., as the number of actions to be performed to complete the task increases. As used herein, a "task action" is an action performed in the process of performing a task. For example, to perform the task of installing software on a computer, entering a registration number may be a task action. An application configured to perform a task in a semi-automated fashion typically requires user input such as the selection or entering of information. For example, several applications exist for performing the task of installing an application on a computer or preparing tax forms for the government.

Although programming a computer to perform a task has several benefits, as the complexity of the task increases, entering the information for the task may grow more confusing to the user, possibly to the point of overwhelming the user. For example, an application to perform a relatively complicated task may be presented in a single continuous form on a computer screen. This form may require the user to scroll down through several pages, each page including several fields for which information must be selected or entered by the user. Such a form may provide no guidance or minimal guidance to the user as to which fields are related to one another, or in what order information should be entered for the fields. Thus, such an application may provide no navigational assistance to the user for performing the task beyond presenting the fields for which information must be entered or selected. This lack of guidance and/or navigational assistance makes performing tasks, particularly complex tasks, difficult for a user.

Accordingly, to make performing such tasks easier, wizards often are employed. As used herein, a "wizard" is a computer-implemented application that assists a user in performing a task by dividing the task into a plurality of sub-tasks, each sub-task including one or more task actions, and assisting the user in navigating through the sub-tasks on a computer. It should be appreciated that each sub-task may include one or more sub-tasks, which each may include one or more sub-tasks, etc. As used herein, "plurality" means two or more.

Wizards are ubiquitous in the computer and software industry. Wizards may be stand-alone applications, for example, an application installation program, or may be embedded within or invoked from within other applications. For example, Microsoft Word includes a letter wizard to assist a user in writing a letter. A wizard typically assists a user in navigating through the sub-tasks of the task by visually presenting each sub-task to the user one after another, for example, in an area of a graphical user interface (GUI). As used herein, the term "serially" means one after another (i.e., not concurrently), such that serially presenting sub-tasks means presenting sub-tasks one after another. As used herein, a "graphical user interface" or "GUI" is a user interface on which information is displayed graphically. As used herein, a "display panel" or "panel" of a GUI is an area within a GUI.

A panel may take any of a variety of forms, including, but not limited to, a window or a menu. A user can enter or select information for the one or more task actions of a sub-task displayed in a panel. It should be appreciated that entering information in a panel may include a user actually entering (e.g., typing) information and may include a user selecting information (e.g., selecting from among enumerated values, selecting a radio button, selecting or not selecting a check box). A panel may enable a user to enter information for a task action, for example, by enabling the user to enter information into a displayed field or by enabling the user to select from a list of information (e.g., by clicking a mouse on a certain location within the panel or within a menu generated by the panel). A "list" of items may include one or more of such items.

Typically, the one or more task actions of a sub-task are related in some way. For example, for a wizard for writing a letter, a first sub-task may include one or more task actions for entering sender information (e.g., a task action for entering the name of the sender and a task action for entering the title of the sender), and a second sub-task may include one or more task actions for entering information about the recipient (e.g., a task action for entering the name of the recipient and a task action for entering the address of the recipient).

Serially presenting sub-tasks of a task to a user on a computer display has several advantages. One advantage is that serial presentation may improve physical navigation through a task. For example, if the task is a relatively large task (i.e., involving many sub-tasks, and/or requiring the presentation and/or entering of significant amounts of information, for example, for task actions of a sub-task), presenting the entire task to the user on a computer screen concurrently or presenting the entire task on a single, continuous form that may span more than one computer screen (i.e., require scrolling) may be confusing to the user and difficult to physically navigate. Serially presenting sub-tasks included in the task may alleviate this problem.

Another advantage is that such serial presentation may improve cognitive navigation by the user, by dividing the task into two or more sub-tasks that each include one or more related task actions. Such a division may improve a user's understanding of each serially presented sub-task, thereby making the entering of information of the sub-task more intuitive for the user.

Yet another advantage is that for each serially presented sub-task, the validity of the information that has been entered for the sub-task may be verified before proceeding to a next sub-task. For example, a wizard for purchasing an item through a web page (e.g., www.amazon.com) may include a panel for the sub-task of entering credit card information. The information entered in this panel may be validated before continuing to a next panel. Without such capability, a user may spend significant time entering information for a plurality of sub-tasks, only to find out at the end of the task that the information entered for a sub-task near the beginning of the task is invalid, such that entering information for all of the other sub-tasks was a waste of time. Further, if the information entered for all of the sub-tasks is not validated until the end of the task, a user may have to wait a significant amount of time for the information to be validated. In response, the user may lose patience and terminate the task or take other action harmful to the proper completion of the task (e.g., hit keys randomly or click a mouse randomly).

Another advantage of serially presenting sub-tasks to a user is that the user has a chance to review and confirm the information (e.g., by clicking on a button labeled 'OK' or 'NEXT') that he or she entered for a given sub-task before advancing to a next sub-task. Reviewing and confirming the information entered for each sub-task individually typically is desirable over reviewing and confirming all of the information entered for an entire task together. Reviewing and confirming information for each sub-task individually reduces the likelihood of a user inadvertently skipping information, or losing track of his/her location within the information, or intentionally skipping information as a result of losing patience or focus due to the tediousness of reviewing all of the entered information together.

There are a variety of types of wizards. One type of wizard is a linear wizard, which serially presents sub-tasks to a user in a predefined order, where the sub-tasks must be performed in the order of presentation. Installation wizards often are linear wizards. A linear wizard may be unidirectional in that the wizard does not allow the user to access a previously performed sub-task by proceeding through previously performed sub-tasks in the reverse order in which the sub-tasks were serially presented and performed. Consequently, a user must restart the wizard if the user wants to change any information entered for a sub-task. Alternatively, a linear wizard may be bi-directional in that the wizard enables the user to access a sub-task by proceeding through the sub-tasks in a reverse order in which the sub-tasks were presented. For example, such bi-directional linear wizard may provide a control button labeled "Back" to the user that enables the user to proceed back through preceding sub-tasks. Thus, the user may change information previously entered for a sub-task without restarting the wizard.

Some linear wizards display a sub-task list while serially presenting the sub-tasks to the user. Such a sub-task list may include a visual indication (e.g., a name or brief description) of each of the plurality of sub-tasks that are serially presented to the user. Typically, the visual indications of the sub-tasks are listed in an order in which the sub-tasks are to be serially presented and performed, thus indicating the order to the user. Some of such wizards may emphasize (e.g., highlight, underline or embolden) the visual indication in the sub-task list that represents the sub-task currently presented, e.g., in a panel, to the user. An example of a linear wizard is InstallAnywhere available from Zero G Software, Inc. of San Francisco, Calif.

A linear wizard may be more desirable than a non-linear wizard (described below) for assisting a user in navigating through a task. For example, if the task includes a plurality of sub-tasks that must be performed in a specific order or for which it is preferred that the steps are performed in a specific order, then a linear wizard may be preferred over a non-linear wizard. Another situation in which a linear wizard may be preferred is if the user performing the task (with the assistance of the wizard) is relatively inexperienced in performing the sub-task. In such a case, it may be desirable to use a linear wizard rather than a non-linear wizard because a linear wizard typically provides more navigational assistance for the user than does a non-linear wizard.

Another type of wizard is a non-linear wizard, which enables a user to control the order in which sub-tasks of a task are performed. A non-linear wizard may include a sub-task list of visual indications of sub-tasks, and enable the user to select the next sub-task to be performed by selecting the visual indication representing the sub-task from the sub-task list. Each visual indication in a sub-task list may be a hyper-link that enables the user to invoke an abstraction (e.g., a document, and object, an application) defined to implement the sub-task represented by the visual indication. Examples of non-linear wizards include the wizards provided to navigate TurboTax and Quicken, respectively, which are available from Intuit, Inc., and the letter wizard of Microsoft Word available from Microsoft Corporation.

Under some circumstances, a non-linear wizard may be more desirable than a linear wizard for assisting a user in navigating through a task. For example, if the task includes a plurality of sub-tasks that may be performed in different orders, then a non-linear wizard may be preferred over a linear wizard. Another situation in which a non-linear wizard may be preferred is if the user performing the task is relatively experienced in performing the sub-task. In such a case, it may be desirable to use a non-linear wizard rather than a linear wizard because a non-linear wizard typically provides less navigational assistance and more flexibility to the user than does a linear wizard. The experienced user may have more knowledge about the task, and thus want to proceed through the sub-tasks in an order other than an order dictated by the wizard. Further, a wizard may provide default values for one or more sub-tasks, for example, values for one or more task actions of a sub-task. A relatively inexperienced user (i.e., a novice) may still want to be directed through sub-tasks for which default values are defined, so that the novice user can learn or confirm the default values. In contrast, an experienced user may wish to skip sub-tasks for which default values are defined because the experienced user knows the default values and does not wish to change them.

SUMMARY

In an embodiment of the invention, a system is provided for assisting a user in navigating through a performance of a task, the task including a plurality of sub-tasks. The system includes a sub-task performance component to control the serial presentation of two or more of the sub-tasks on a graphical user interface, each of the two or more sub-tasks displayed in a respective panel of the graphical user interface, and to enable the user, for each of the two or more sub-tasks, to perform the sub-task by entering information into the respective panel of the sub-task as the sub-task is presented. The system further includes a sub-task list component to control the display of a sub-task list of items to the user on a graphical user interface while the two or more sub-tasks are being presented, each item representing a respective one of the plurality of sub-tasks and including a sub-task identifier identifying the respective one of the sub-tasks, including displaying, within at least one of the items, information corresponding to the sub-task represented by the at least one item.

In an aspect of this embodiment, the sub-task list component is operable, for each of the at least one items, to control the display in the item of information entered by the user in the panel of the sub-task represented by the item.

In another aspect of this embodiment, the sub-task list component is operable, for each of the at least one item, to control the change of the information displayed within the item based on information entered by the user in the panel of at least one of the two or more sub-tasks.

In yet another aspect of this embodiment, the sub-task list component is operable to enable the user to perform the two or more of the sub-tasks in a temporal order in which the user selects the two or more items representing the two or more sub-tasks, respectively, from the sub-task list.

In another aspect of this embodiment, the sub-task list component is operable to enable the user to perform the two or more sub-tasks in a temporal order that is independent of a positional order in which the two or more sub-tasks items representing the two or more sub-tasks, respectively, are listed.

In another aspect of this embodiment, the sub-task presentation component is operable to determine one or more of the sub-tasks required to perform the task based on information entered by the user in the respective panels of at least one of the two or more sub-tasks.

In yet another aspect of this embodiment, the sub-task presentation component is operable to determine one or more of the items to include in the sub-task list based on information entered by the user in the respective panels of at least one of the two or more sub-tasks.

In another aspect of this embodiment, the sub-task presentation component is operable, in the event that information already has been entered by the user for a first sub-task, to determine that an item representing the first sub-task is no longer to be included in the sub-task list and to control notifying the user that confirming an acceptance of the information entered in the first panel will result in the information entered for the second sub-task being discarded.

In another aspect of this embodiment, the system is operable to perform the task of creating one or more rules of an access control sub-task list for a network device.

In yet another aspect of this embodiment, the sub-task list component is operative to vertically orient the sub-task list on the graphical user interface.

In another embodiment of the invention, a user is assisted in navigating through a performance of a task on a computer, the task including a plurality of sub-tasks. Two or more of the sub-tasks are serially presented on a graphical user interface, each of the two or more sub-tasks displayed in a respective panel of the graphical user interface. For each of the two or more sub-tasks, the user is enabled to perform the sub-task by entering information into the respective panel of the sub-task as the sub-task is presented. While the two or more sub-tasks are being presented, a sub-task list of items is displayed to the user on the graphical user interface, each item representing a respective one of the plurality of sub-tasks and including a sub-task identifier identifying the respective one of the sub-tasks. For at least one of the items, information corresponding to the sub-task represented by the at least one item is displayed.

In an aspect of this embodiment, for each of the at least one items, information entered by the user in the panel of the sub-task represented by the item is displayed in the item.

In another aspect of this embodiment, for each of the at least one item, the information displayed within the item is changed based on information entered by the user in the panel of at least one of the two or more sub-tasks.

In another aspect of this embodiment, the user is enabled to perform the two or more of the sub-tasks in a temporal order in which the user selects the two or more items representing the two or more sub-tasks, respectively, from the sub-task list.

In yet another aspect of this embodiment, the user is enabled to perform the two or more sub-tasks in a temporal order that is independent of a positional order in which the two or more sub-tasks items representing the two or more sub-tasks, respectively, are listed.

In another aspect of this embodiment, one or more of the sub-tasks required to perform the task based is determined based on information entered by the user in the respective panels of at least one of the two or more sub-tasks.

In another aspect of this embodiment, one or more of the items to include in the sub-task list is determined based on information entered by the user in the respective panels of at least one of the two or more sub-tasks.

In yet another aspect of this embodiment, information already has been entered by the user for a first sub-task, and it is determined that an item representing the first sub-task is no longer to be included in the sub-task list. The user is notified that confirming an acceptance of the information entered in the first panel will result in the information entered for the second sub-task being discarded.

In another aspect of this embodiment, performing the task includes creating one or more rules of an access control sub-task list for a network device.

In another aspect of this embodiment, the sub-task list is vertically-oriented on the graphical user interface.

In another embodiment of the invention, computer-readable signals are stored on a computer-readable medium, such signals defining instructions that, as a result of being executed by a computer, instruct the computer to perform the method of the embodiment described in the preceding paragraphs.

In yet another embodiment of the invention, a system is provided for assisting a user in navigating through a performance of a task, the task including a plurality of sub-tasks. The system includes a sub-task performance component to control the serial presentation of two or more of the sub-tasks on a graphical user interface, each of the two or more sub-tasks displayed in a respective panel of the graphical user interface, and to enable the user, for each of the two or more sub-tasks, to perform the sub-task by entering information into the respective panel of the sub-task as the sub-task is presented. The system further includes a sub-task list component to control the display of a sub-task list of items to the user on a graphical user interface while the two or more sub-tasks are being presented, each item representing a respective one of the plurality of sub-tasks and including a sub-task identifier identifying the respective one of the sub-tasks. The system further includes means for displaying, within at least one of the items, information corresponding to the sub-task represented by the at least one item.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
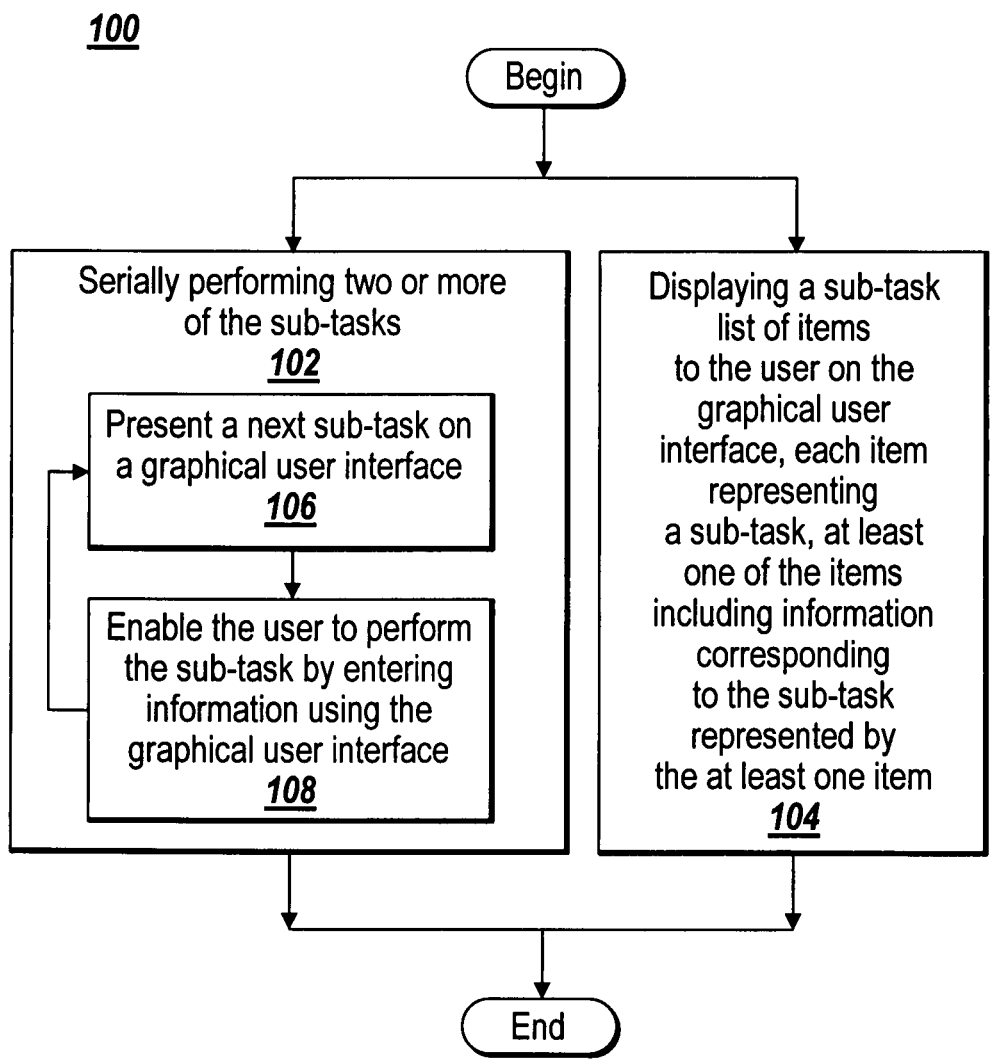
FIG. 1 is a flowchart illustrating an example of a method of assisting a user in navigating through performance of a task, including displaying a sub-task list of items to the user, at least one of the items in the sub-task list including information corresponding to the sub-task represented by the at least one item.

A shortcoming of existing wizards, whether linear or non-linear, and whether including a sub-task list or not including a sub-task list, is that as the user is presented a current sub-task (e.g., in a panel), information corresponding to other sub-tasks (beyond a mere identification of the sub-task) is not visually indicated to the user. Such information may include default information supplied for a sub-task and/or information entered for the sub-task by a user. Consequently, the user must perform one or more additional steps to learn information corresponding to the other sub-tasks. For a linear wizard, additional steps may include completing one or more sub-tasks, restarting the wizard or traversing back through previously performed sub-tasks in reverse order. For a non-linear wizard, additional steps may include selecting another sub-task such that the panel for the current sub-task is closed and a new panel is displayed including information for the selected sub-task. Having to perform additional steps increases the time, and consequently, the cost of performing a sub-task. This increased time and cost may become more significant as the number of task actions necessary to complete the task increases and/or as the number of times that the task is performed increases.

Another shortcoming of existing wizards is that, if a user enters information for a sub-task currently being performed (i.e., the current sub-task) that changes information (default information or entered information) corresponding to one or more other sub-tasks, the changed information is not indicated to the user as the user is presented the current sub-task. Some wizards present a summary of information after a user has performed all the sub-tasks of a task. This summary typically includes information corresponding to a plurality of the sub-tasks, which may include information for a sub-task that changed as a result of information entered for another sub-task. However, the user may not realize that some of the information corresponding to one or more sub-tasks changed during performance of the task as a result of information entered for another sub-task. Further, displaying the changed information to the user at the end of performing the task may result in the user having performed one or more task actions (or entire sub-tasks) that the user would not have performed had the user been made aware of the changed information earlier. Further, the user may have performed task actions (or entire sub-tasks) differently had the user been made aware earlier of the changed information. Thus, displaying information, including changed information, to the user only after the plurality of sub-tasks has been performed may result is wasted effort by the user and may require the user to make several changes to information that otherwise would not have had to be made.

Accordingly, in one aspect, provided is a method of assisting a user in navigating through performance of a task While two or more sub-tasks are serially presented in respective sub-task panels, a list of sub-task items (a "sub-task list") is displayed to the user. Displaying the sub-task list may include displaying, within at least one item of the sub-task list, information corresponding to the sub-task represented by the at least one item. Such information may include default information supplied for the sub-task (e.g., for one or more task actions of the sub-task) and may include information entered by the user for the sub-task (e.g., for one or more task actions of the sub-task). Accordingly, as the user is entering information for the two or more sub-tasks, the user can view the information displayed within the at least one item. The sub-tasks may be serially presented to the user in a predefined sequence or the user may be enabled to control the order in which the sub-tasks are presented, for example, by selecting items from the sub-task list. In an aspect of the invention, one or more sub-tasks are presented to the user in accordance with a predefined sequence and one or more sub-tasks are presented in an order controlled by the user.

In another aspect of the invention, one or more sub-tasks may be presented to the user in a predefined order, but the user can override this order by selecting one or more items from the sub-task list. Accordingly, a user who is a novice in performing the task may be guided through each sub-task, which may be desirable for a novice user, but a user experienced in performing the task may override the predefined order by selecting items from the sub-task list, which may be desirable for an experienced user. The user may skip one or more sub-tasks, for example, sub-tasks for which the user does not wish to change the default values. Further, the user may be able to perform sub-tasks of a task in an order deemed most efficient by the user. For example, an experienced user may understand that performing certain sub-tasks before others reduces the number of task actions that need to be performed. Displaying information corresponding to one or more items of the sub-task list further assists the user in performing a task more efficiently, as the user can glance at the information displayed in one or more items to determine if the information should be changed, as opposed to selecting one or more items from the sub-task list.

Thus, to review default information or information entered for a sub-task other than the sub-task that the user is currently performing, the user does not have to perform an additional step, for example, performing one or more sub-tasks, restarting an application, clicking back through one or more previously performed sub-tasks, or selecting a sub-task (e.g., clicking at a visual indication of the sub-task within a sub-task list).

Further, the information displayed in an item of the sub-task list may be changed based on information entered by the user for another sub-task. For example, after the user enters the information for one or more task actions of the other sub-task, the user may indicate completion of the sub-task, for example, by clicking on a control button (e.g., a control button labeled "OK"). In response, the information displayed in one or more items may be updated. Accordingly, a user can be made aware of how information entered for one sub-task impacts information corresponding to one or more other sub-tasks before performing any more sub-tasks, which may cause the user to perform additional sub-tasks differently or to refrain from performing additional sub-tasks, thereby preventing the user from wasting time. Further, the user may decide not to save the information entered for the current sub-task and re-enter new information or exit the sub-task, for example by clicking a control button labeled "Exit".

Such a method of assisting a user in navigating through performance of a task may be tangibly embodied on a computer-readable medium having computer-readable signals stored thereon that define instructions that, as a result of being executed by a computer, control the computer to perform such method.

In another aspect, a system for assisting a user in navigating through a performance of a task is provided. The system may include a sub-task performance component to serially present two or more sub-tasks in respective sub-task panels, and a sub-task list component to control the display of the sub-task list while the two or more sub-tasks are serially presented. The sub-task list component may be operable to display, within at least one of the items, information corresponding to a sub-task represented by the at least one item. Further, the sub-task presentation component may be operable to serially present each sub-task to the user in a predefined sequence or the sub-task list component may enable a user to control the order in which the sub-tasks are performed, for example, by selecting items from the sub-task list, which may control the sub-task performance component to present sub-tasks represented by the items selected by the user. Such system may be enabled to implement the method, described above, of assisting a user in navigating through a task.

Although several of the examples described below are described in relation to defining an Access Control List (ACL), aspects of the invention are not limited to such application. Aspects of the invention may be employed to perform any of a variety of tasks on a computer, including, but not limited to, installing software on a computer, writing a letter (or other document having a relatively standard form) using a word processing application, purchasing an item on-line, defining a network device or parameters of a network device, filling out tax forms, performing a financial analysis, defining a report, defining rules for an application, etc.

The function and advantage of these and other aspects of the present invention will be more fully understood from the examples described below. The following examples are intended to facilitate the reader's understanding of aspects of the invention and illustrate the benefits of such aspects, but do not exemplify the full scope of the invention.

EXAMPLES

FIG. 1 is a flow chart illustrating an example of a method 100 of assisting a user in navigating through performance of a task using a GUI.

In Act 102, two or more sub-tasks of the task are serially performed while Act 104 is being performed. Serially performing two or more of the sub-tasks may include Act 106 of presenting a next sub-task to a user on the GUI, and Act 108 of enabling the user to perform the sub-task by entering information using the GUI. Acts 106 and 108 may be repeated until there are no more sub-tasks left to be performed to complete the task or until performance of the task is terminated by the user or the system performing the task.

Act 104 is performed in parallel (as opposed to in series) to Act 102. Act 104 includes displaying a sub-task list of items to the user on the GUI, where each item represents a sub-task. At least one of the items may include information corresponding to the sub-task represented by the at least one item. Such information may include default information and/or information entered by the user. Further, the information corresponding to one or more sub-tasks may be changed based on information entered for one or more sub-tasks.

Each item of the sub-task list may include any of a variety of information corresponding to the sub-task represented by the item. For example, all of the default values or values entered by the user for the sub-task may be included within the item. Alternatively, less than all of the default values and entered values may be included within the item. The sub-task list may be configured to include certain pieces of information based on any of a variety of factors. For example, information to be included may be determined based on the significance of the information to the user in the context of the task being performed, or may be based on the amount of space available within the sub-task list to display information. Any of a variety of other factors may be used to configure the information displayed within each item of the sub-task list. Further, the sub-task list may be configured to allow the user to select the information to be included within each item, for example, before beginning the task or during the performance of the task.

The two or more sub-tasks may be serially performed in a predefined order, or the user may control the order in which the sub-tasks are presented and performed, for example, by selecting items from the sub-task list.

Method 100 may include one or more of the acts of method 300 described below in relation to FIGS. 3A and 3B.

Figure 2:
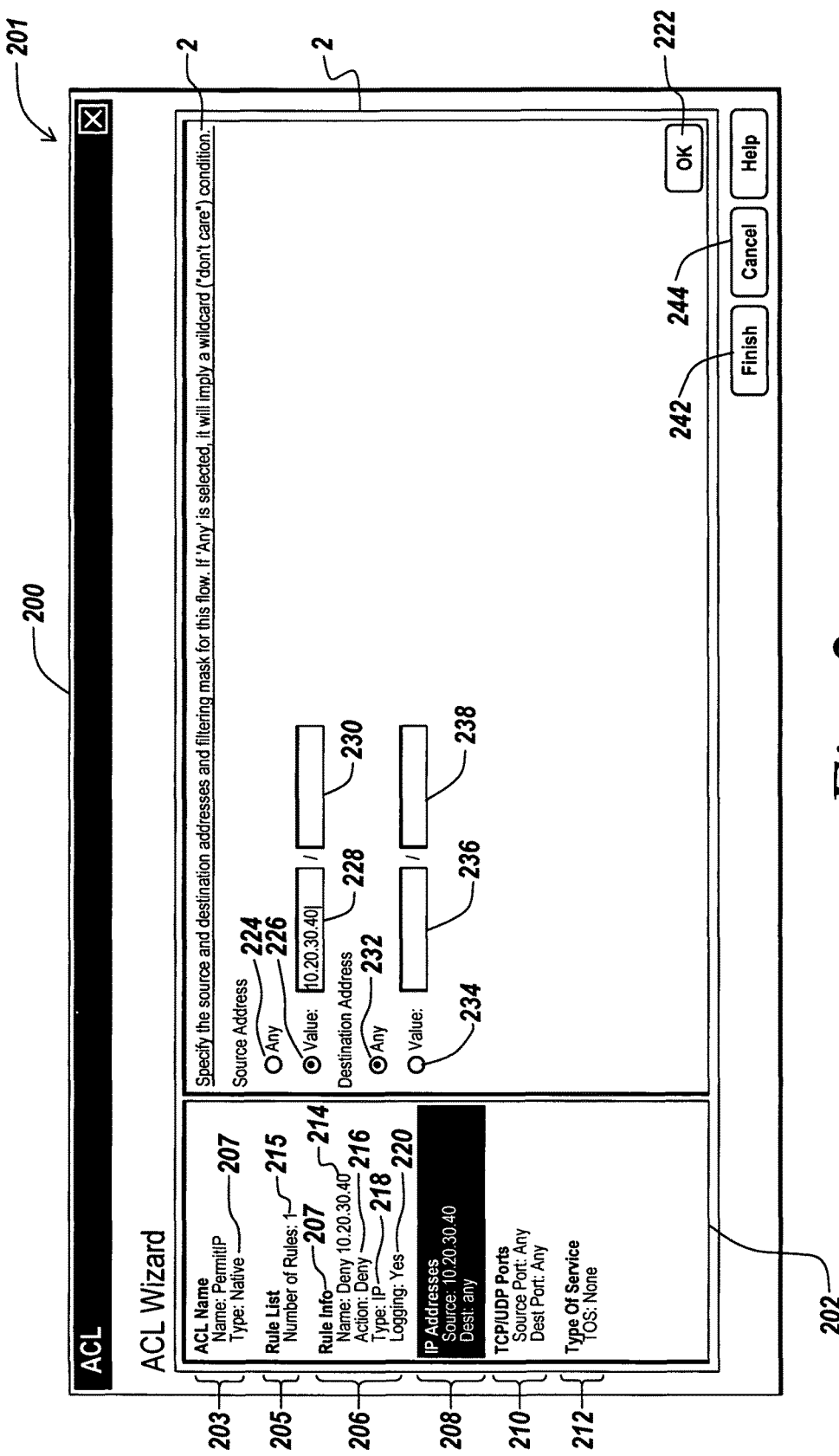
FIG. 2 is a screen shot illustrating an example of a graphical user interface including a sub-task list including information corresponding to one or more sub-tasks and including an area for visually presenting and performing a sub-task.

FIG. 2 is a screen shot illustrating an example of a GUI 200 including a sub-task list 202 and a sub-task panel 204. GUI 200, in each of FIGS. 2 and 4-11, may result from performance of method 100 and/or 300 described below in relation to FIGS. 3A and 3B, and may be generated by system 1200 described below in relation to FIG. 12. In the embodiment of FIG. 2, the task being performed may be defining an ACL for a network device, for example, a router.

Sub-task list 202 may include items 203, 205, 206, 208, 210 and 212. Each item may include a sub-task identifier specifying the sub-task represented by the item and may include information corresponding to the sub-task represented by the at least one item. This information may be default information provided for the sub-task or may be information entered by a user, for example, in a sub-task panel.

Item 203 includes a sub-task identifier that specifies that this item represents the sub-task of naming the ACL. It should be appreciated that the sub-task identifier may not precisely identify the sub-task. For example, the identifier for item 203 specifies that item 203 represents a sub-task for naming the ACL, however, as can be seen from the information included within item 203, this sub-task also includes defining a type for the ACL. Thus, the sub-task represented by item 203 may be a sub-task for entering general information for an ACL.

Item 205 includes a sub-task identifier specifying that this item represents a sub-task associated with the list of rules of the ACL. Item 208 includes a sub-task identifier specifying that this item represents a sub-task for entering IP addresses for a rule.

Item 210 includes a sub-task identifier specifying that the sub-task represented by this item is for entering TCP/UDP ports for a rule. Item 212 includes a sub-task identifier specifying that item 212 represents a sub-task for entering a type of service for a rule.

As set forth above, an item also may include information corresponding to the sub-task represented by the item. For example, item 206 includes sub-task identifier 213, which specifies that item 206 represents a sub-task for entering rule information for a rule of an ACL. Item 206 also includes information 214, 216, 218 and 220. Information 214 indicates that the name of the rule is "Deny 10.20.30.40". Information 216 indicates that this rule is for denying access. Information 218 indicates that the type of the rule is an IP rule and information 220 indicates that logging will be applied to the rule.

Thus, sub-task list 202 displays information corresponding to a plurality of sub-tasks, which can be viewed by the user while the user performs a sub-task using sub-task panel 204, which will now be described.

Concurrently to displaying sub-task list 202, GUI 200 may display sub-task panel 204, which may be a sub-task panel for entering information for a sub-task represented by item 208, as may be indicated by the highlighting of item 208. Such highlighting or other techniques for emphasis may be used to inform the user of the item and sub-task being presented in sub-task panel 204. Such sub-task may include one or more task actions, for example, entering one or more source addresses for a packet and entering one or more destination addresses for a packet. Sub-task panel 204 may include any of a variety of controls to assist a user in entering information for performing the task actions of the sub-task represented by item 208, for example, radio buttons 224, 226, 232 and 234 and text boxes 228, 230, 236 and 238. Any of a variety of other types of controls may be used, for example, combo boxes and drop menus.

Radio buttons 224, 226 and text box 228 may be used to enter one or more source addresses to which this rule will apply, and text box 230 may be used to specify a sub-network mask. Radio buttons 232, 234 and text box 236 may be used to specify one or more destination addresses to which the rule will apply, and text box 238 may be used to specify a sub-network mask to be applied to determine the destination address of packets.

Task panel 204 also may include additional information to assist a user in performing a sub-task, for example, information 240 for assisting a user in entering IP address information for a rule of an ACL list. Task panel 204 also may include a sub-task completion control, for example, control button 222 that enables a user to signify when the user intends to complete a task.

Although GUI 200 presents the sub-task list 202 vertically, a sub-task list (e.g., list 202) may be horizontally-aligned in that items are listed horizontally. For example, items 203, 205, 206, 208, 210 and 212 may be arranged in one or more parallel rows, where each item may be included on a tab of a panel, and where, at any given time, one of the panels is superimposed over the remaining panels while all of the tabs remain visible to the user. Thus, to select a sub-task to be performed from such horizontal sub-task list, the user may select (e.g., click-on) the tab including the item representing the sub-task. As a result, the panel for the sub-task represented by the selected item may be displayed and superimposed over the other panels.

Figure 3A:
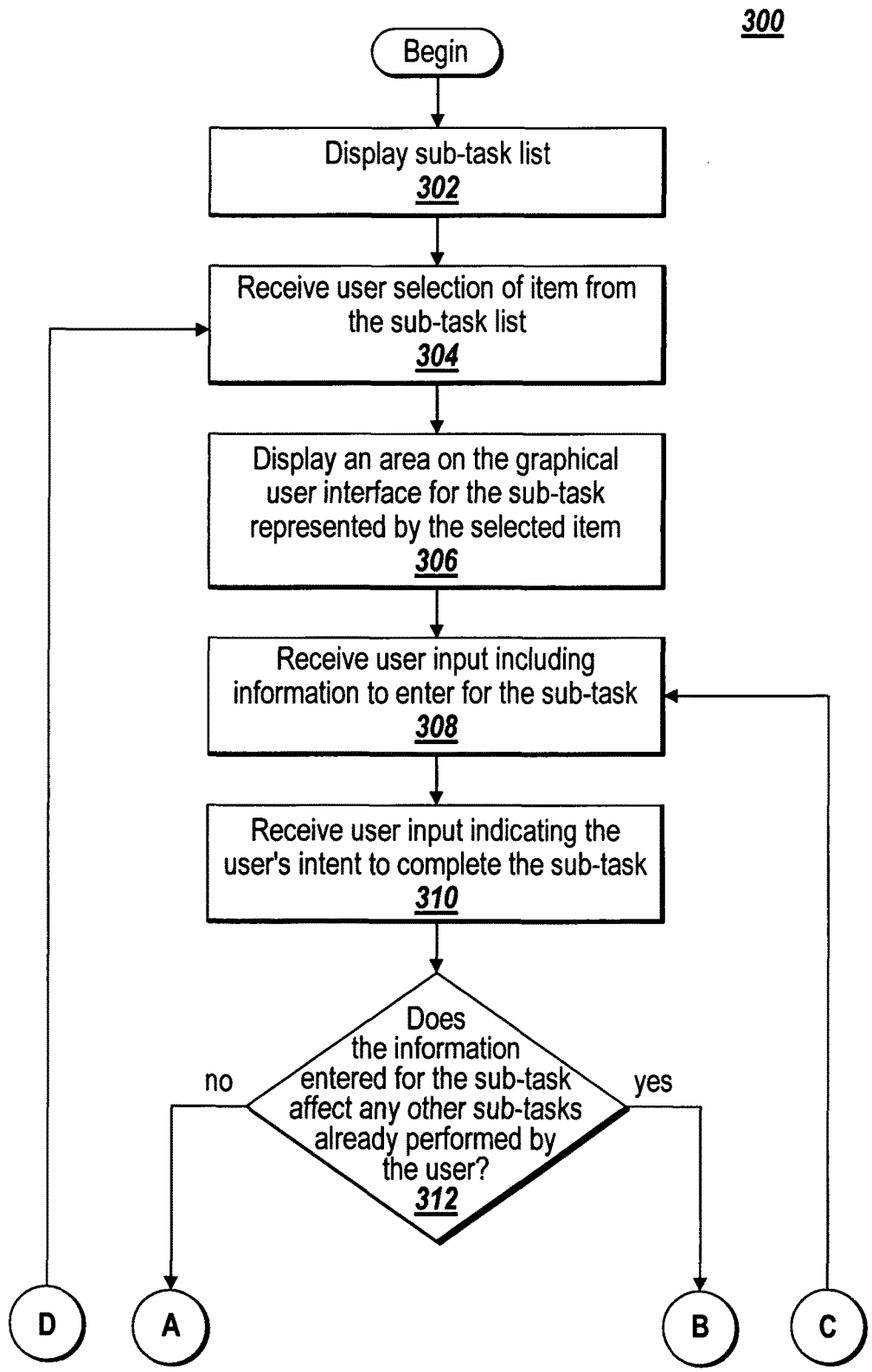
FIGS. 3A and 3B comprise a flowchart illustrating an example of a method of assisting a user in navigating through performance of a task, including displaying a sub-task list of items to the user, at least one of the items in the sub-task list including information corresponding to the sub-task represented by the at least one item.
Figure 3B:
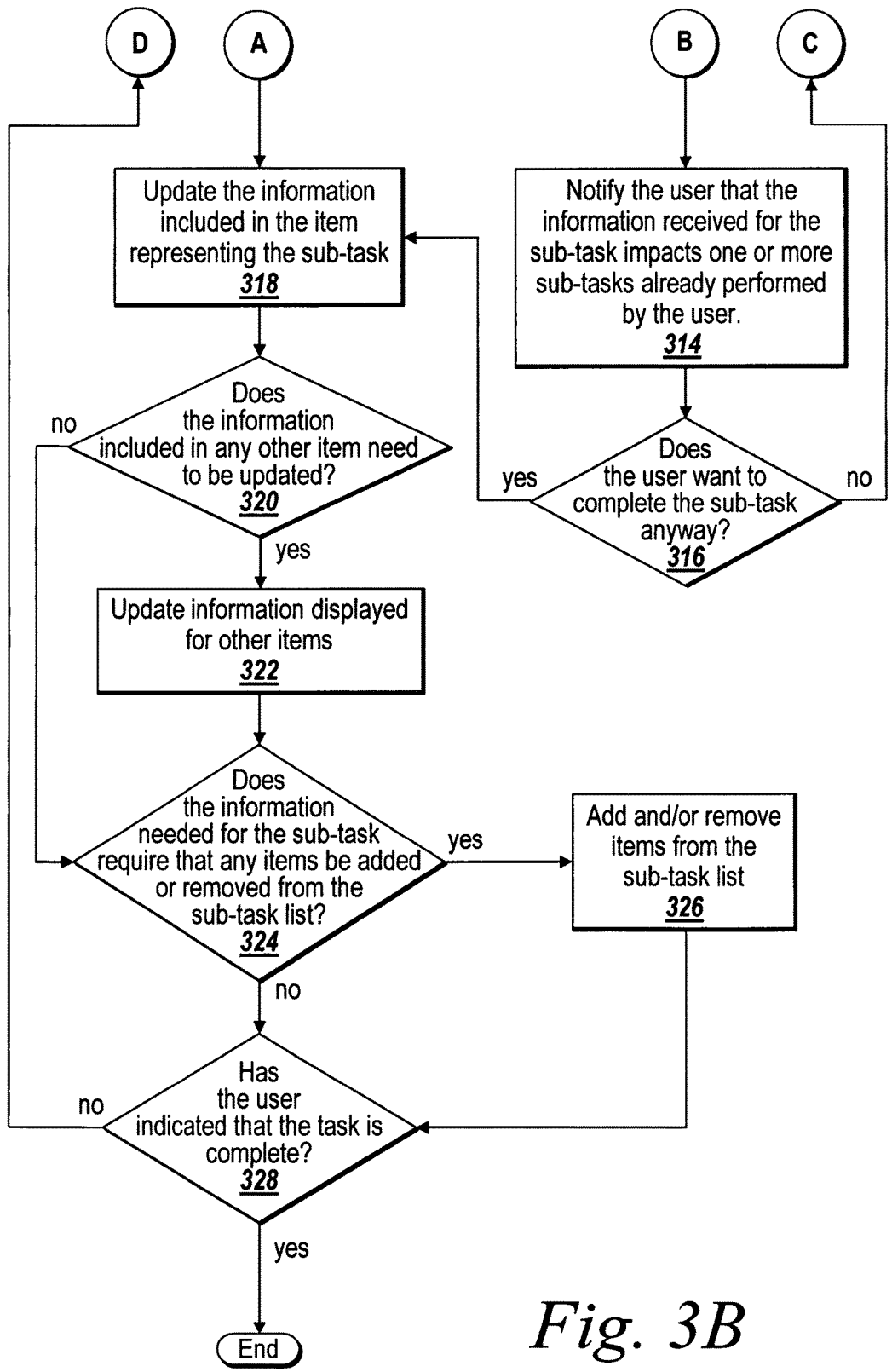

FIGS. 3A and 3B comprise a flowchart 300 illustrating an example of a method for assisting a user in navigating a task. In Act 302, a sub-task list may be displayed, for example, on a GUI. The sub-task list may include a plurality of items, each item representing a sub-task. At least one of the items may include information corresponding to the sub-task represented by the at least one item. This information may include default values for one or more task actions of a sub-task and may include one or more values entered by a user for one or more task actions of the sub-task.

As will be described in more detail below, the items displayed in the sub-task list may change over time, for example, depending upon information entered by the user for one or more sub-tasks. Thus, the sub-task list displayed in 302 may be different than the sub-task list displayed at different times during performance of method 300.

In Act 304, a user selection of an item from the sub-task list is received. For example, the user may have clicked on the item from the sub-task list, or selected the item using the keyboard to enter a value or to scroll through items of the sub-task list.

In Act 306, an area may be displayed on the GUI for the sub-task represented by the item selected in Act 304. It should be appreciated that, optionally, the next sub-task for which an area is displayed on the GUI may be predetermined and, therefore, not based on a user selection such as the user selection of Act 304.

If the task being performed is defining an ACL, Act 304 may include selecting item 208 of sub-task list 202 and Act 306 may include displaying sub-task panel 204.

In Act 308, user input including information to enter for the sub-task may be received, for example, by a user selecting a value using a mouse or keyboard, or by a user entering a value using the keyboard. If the sub-task is defining IP address information for a rule of an ACL list, Act 308 may include receiving information entered in text box 228 of sub-task panel 204.

In Act 310, user input indicating the user's intent to complete the sub-task may be received. For example, user input resulting from a user clicking on a control button such as control button 222 of sub-task panel 204 may be received.

In Act 312, it may be determined whether the information entered for the sub-task affects any other sub-tasks already performed by the user. For example, the information entered for the sub-task may change information entered by the user for other tasks or may require that one or more sub-tasks for which information has already been entered be removed from the task list.

If it is determined that the information entered does affect other sub-tasks that have already been performed, then in Act 314, the user may be notified of such impact. For the sub-tasks for which information will change, it may be desirable to notify the user so that the user understands the impact that the information will have on other sub-tasks.

This notification enables the user to make an informed decision as to whether the user wants to complete the sub-task. For already-performed sub-tasks that may be removed from the sub-task list as a result of completion of the current sub-task, it may be desirable to notify the user so that the user does not inadvertently cancel these sub-tasks. Preventing the inadvertent canceling of sub-tasks becomes more significant as the number of task actions and/or amount of information entered for such sub-tasks increases.

Following Act 314, in Act 316, it may be determined whether the user still wants to complete the sub-task, for example, if the user is willing to accept that one or more already-performed sub-tasks will be changed or removed from the sub-task list.

If the user indicates that the user does not want to complete the sub-task, for example, by clicking a control button labeled "No", then method 300 may return to Act 308. Alternatively, the user may be presented with the option of exiting the sub-task panel presented for the current task. For example, the user may be presented with a button labeled "Cancel" or "Exit". It should be appreciated that the user may be capable of exiting the performance of a sub-task (e.g., exiting a sub-task panel) or exiting the performance of the entire task at any point during the performance of method 300. To exit the GUI, the user may be enabled to control the exiting from the task, for example, by clicking on a control button labeled "exit" or "cancel" such as illustrated by control button 244 of GUI 200. It may be desirable for the user to save any information that has been entered for a task even if the user has not completed the task. In such case, the user may be enabled to save (e.g., on a non-volatile recording medium) the information that has been entered for the task and be allowed to return later to finish the task. Adding and removing sub-tasks from a sub-task list are described below in more detail in relation Acts 324 and 326.

In Act 312, if it is determined that the information entered for a current sub-task does not affect any other sub-tasks or if the user indicates that the user wants to complete the sub-task in Act 316, then, in Act 318, the information included in the item of the sub-task list that represents the sub-task may be updated with the information entered for the sub-task. For example, referring to GUI 200 of FIG. 2, after the user clicks on button 222, the information displayed within item 208 may be updated with any information present in sub-task panel 204 at the time button 222 is selected.

In an embodiment, the information included within any items of the sub-task list is updated while the user is entering information in sub-task panel 204. The information within such items may be updated provisionally, pending the user's decision of whether to save the information entered for the current sub-task, and may be changed back to their previous values if the user decides not to save such information. Thus, the user can be made aware of how information currently being entered in the sub-task panel affects other sub-tasks should the current sub-task be saved with such entered information.

In Act 320, it may be determined whether the information included in any other items of the sub-task list needs to be updated as a result of the information entered for the current sub-task. Each of the other items may represent a sub-task that has already been performed or has not yet been performed. For example, for a task for installing a program, one sub-task may require the user to enter information about the computer on which the software is being installed, for example, the type of computer, the type of operating system, the amount of RAM on the computer, etc. Another sub-task of installing the software may include entering one or more locations at which files for the software will be located. These locations may depend at least in part on the type of computer being used (e.g., a PC or a Macintosh) and/or the operating system installed on the computer. This location information may be displayed within an item of the sub-task list representing the sub-task for entering location information. Accordingly, in response to the user entering the type of computer and/or the operating system on a sub-task panel, the location information displayed in such item may be updated because the previous location information included in such item may not be compatible with the type of computer and/or operating system entered.

If the information included in one or more other items needs to be updated, then, in Act 322, the information displayed for the one or more other items is updated.

After Act 322 is performed, or if it is determined in Act 320 that no information included in any other item needs to be updated, then, in Act 324, it may be determined whether the information received for the current sub-task requires that any items be added or removed from the sub-task list.

In an aspect of the invention, one or more of the sub-tasks to be performed (and consequently one or more items to include in the sub-task list) depend on information entered for one or more sub-tasks.

For example, referring to GUI 200 of FIG. 2, item 203 includes information 207 indicating the type of ACL, and item 206 includes information 218 specifying the type of rule. Each of these fields may control whether one or more other items, for example, items 208, 210 and 212 are included in sub-task list 202. Items 208, 210 and 212 may represent some tasks that are performed for a "native" type of ACL (as indicated by information 207) and an "IP" type of rule (as indicated by information 218). However, if the value for information 207 or information 218 changes, one or more of the sub-tasks represented by items 208, 210 and 212. They no longer need to be performed to complete the task. Accordingly, one or more of items 208, 210 and 212 may be removed from sub-task list 202.

If it is determined in Act 324 that items are to be added or removed from the sub-task list, then in Act 326 the items are removed or added from the sub-task list.

If it is determined in Act 324 that items are not to be added or removed from the sub-task list, or after such items have been added or removed in Act 326, then, in Act 328 it is determined whether the user has indicated that the task is complete. For example, the user may click on a control button labeled "Finish" or "Cancel", for example, the user may click on one of control buttons 242 and 244 of GUI 200.

If it is determined in Act 328 that the user has not indicated that the task is complete, then method 300 may return to Act 304, or else the method may end. It should be appreciated that the user may elect to terminate the task at other points during performance of Method 300. For example, Method 300 may proceed directly from Act 324 or 326 to Act 304, unless an indication of the user's intent to complete the task is received. Further, as noted above, as an alternative to receiving a user selection of an item from the sub-task list in Act 304, the next sub-task to be performed may be selected according to a predefined order.

Methods 100 and 300 each may include additional acts. Further, the order of the acts performed as part of each method is not limited to the order illustrated in FIGS. 2, 3A and 3B as the acts may be performed in other orders, and one or more of the acts of each method may be performed in series or in parallel to one or more other acts of such method, or parts thereof.

Methods 100 and 300 are merely illustrative embodiments of methods of assisting a user in the navigation of a task including a plurality of sub-tasks. Such illustrative embodiments are not intended to limit the scope of the invention, as any of numerous other implementations of methods of assisting a user in the navigation of a task including a plurality of sub-tasks, for example, variations of methods 100 and 300, are possible and are intended to fall within the scope of the invention.

Methods 100 and 300, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof.

FIGS. 4-11 comprise screen shots illustrating an example of a GUI 200 for assisting a user in navigating through performance of a task, including displaying a sub-task list of items to the user on the GUI, where at least one of the items includes information corresponding to the sub-task represented by the at least one item.

Figure 4:
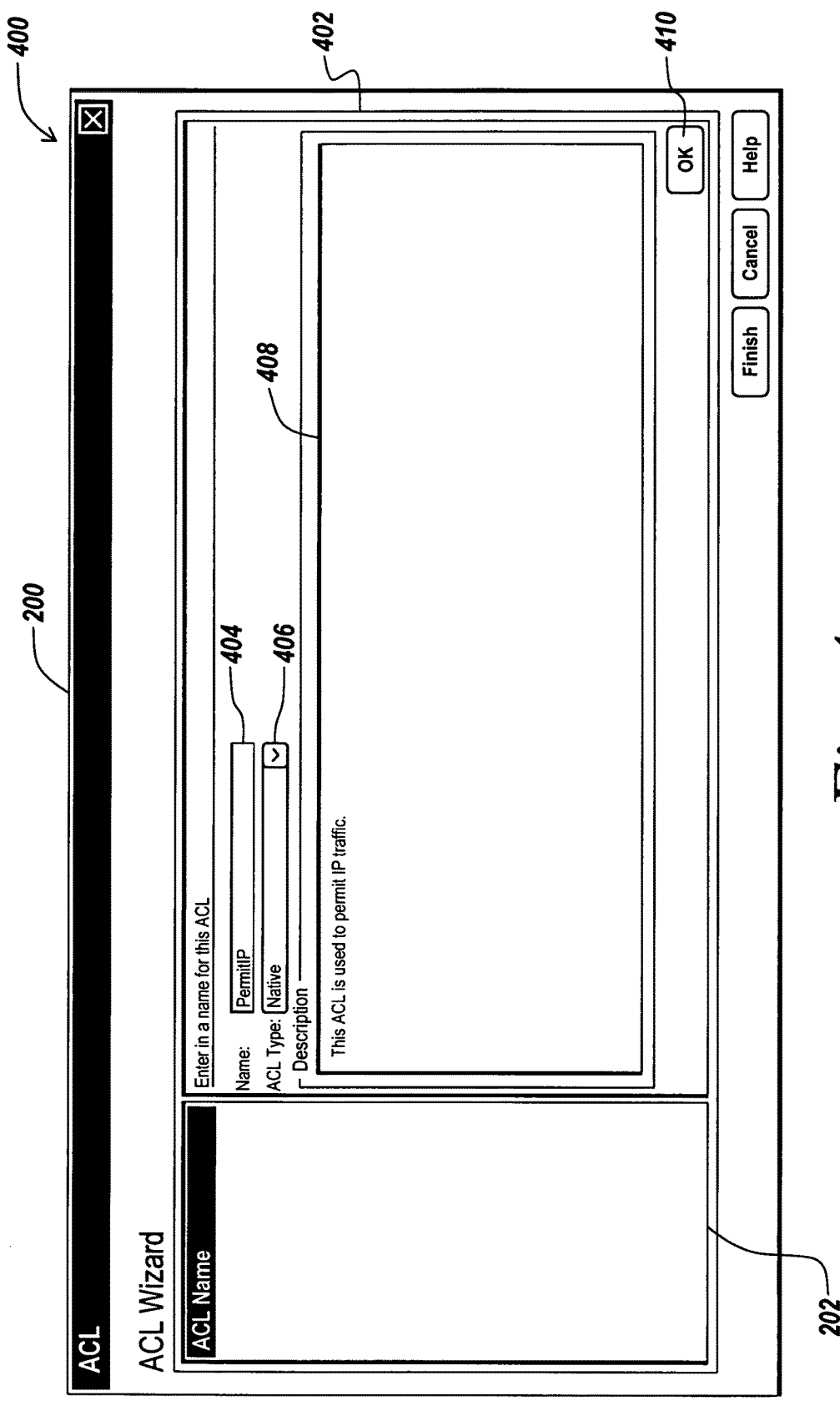
FIGS. 4-11 comprise screen shots illustrating an example of a GUI for assisting a user in navigating through a performance of a task, including displaying a sub-task list of items to the user on the GUI, at least one of the items including information corresponding to the sub-task represented by the at least one item.

In screen shot 400 of FIG. 4, GUI 200 includes sub-task list 202 and sub-task panel 402 corresponding to the task represented by item 203. As described above, although one or more sub-tasks of the task may be determined based on information entered by the user, and the order in which some sub-tasks are performed may be controlled by the user, other sub-tasks may be required to complete the task and may be presented in a predefined order to the user. Accordingly, the sub-task for naming the ACL and providing other general information about the ACL automatically may be presented to the user in sub-task panel 402.

As indicated in fields 404, 406 and 408, the name of the ACL is "PermitIP", the type of the ACL is "Native" and the ACL is used to permit IP traffic. The information in fields 404 and 408 may have been entered by the user, whereas the information in field 406 may have been selected from a list of possible types. The type of ACL may correspond to the type of network device on which the ACL may be applied. A "Native" type of network device may be an X-Pedition router available from Enterasys Networks, Inc. of Andover, Mass. Any of a variety of other types of ACLs may be specified, for example, an ACL suitable for application on a router configured to support an open IP standard.

Figure 5:
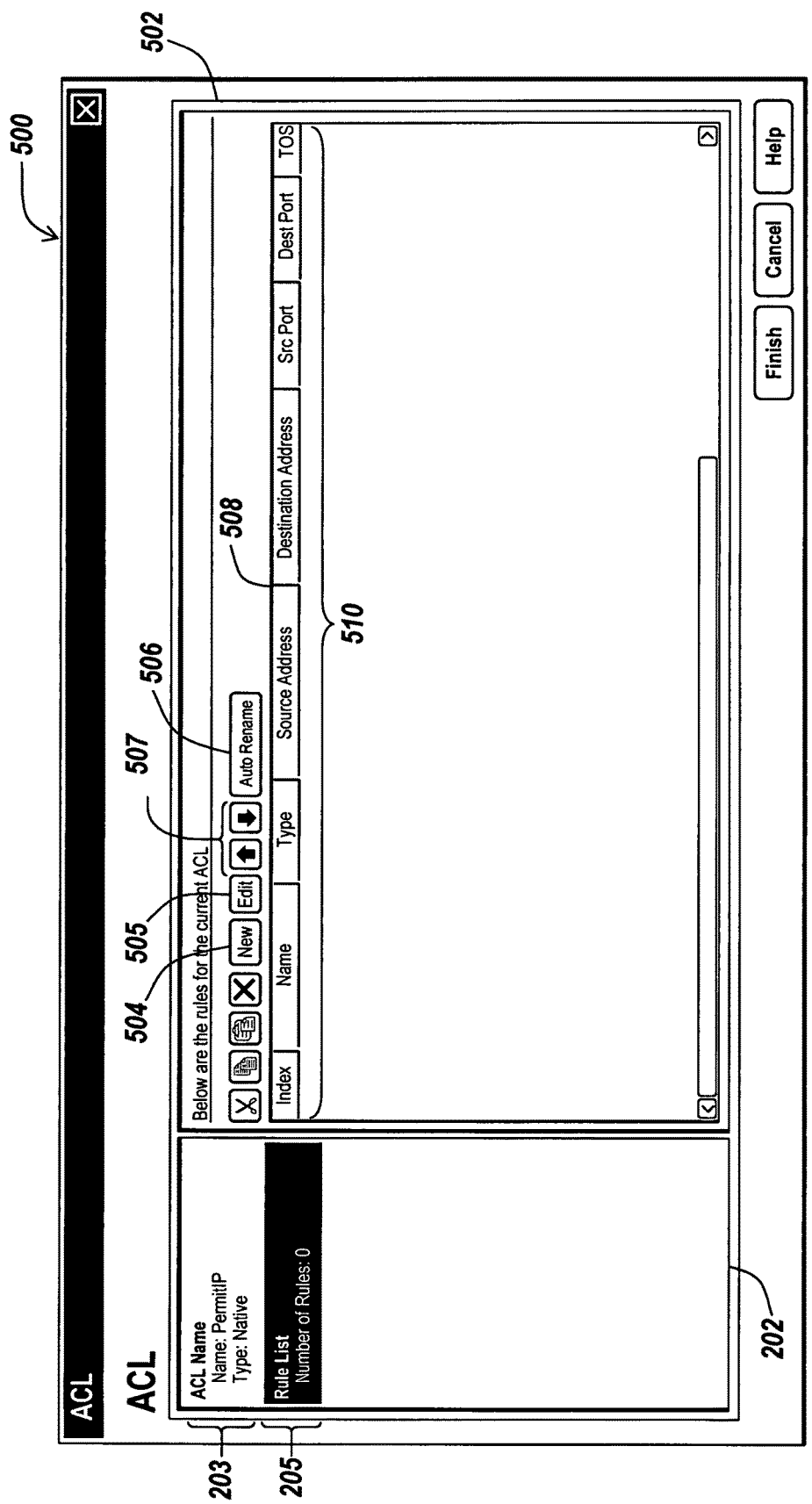
Figure 6:
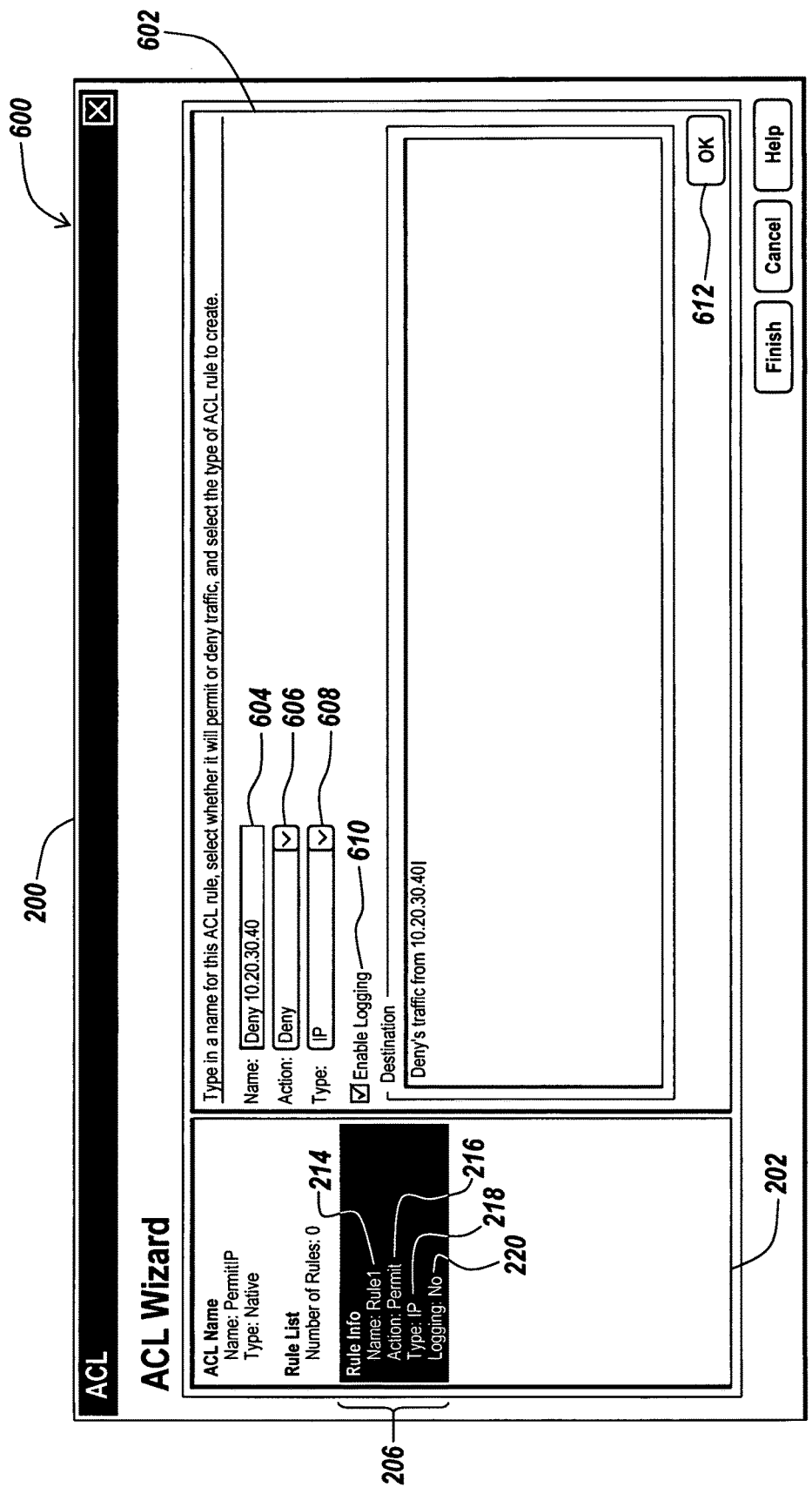

After the user clicks the control button 410 and the information entered in sub-task panel 402 is verified, then GUI 200 may be updated as illustrated in screen shot 500 of FIG. 5.

In screen shot 500, GUI 200 includes sub-task list 202 and sub-task control panel 502 corresponding to the sub-task represented by item 205. Item 203 has been updated to include the information selected and/or entered by the user in sub-task panel 402. Further, item 205 includes information indicating that there are currently no rules defined for this ACL. Sub-task panel 502 includes several control buttons for adding and editing rules of an ACL. For example, control button 504 may allow a user to enter a new rule, control button 505 may allow a user to edit a rule, and control button 506 may allow a user to automatically rename all of the rules included within the ACL. For example, selecting button 506 may give each rule a name corresponding to the position of the rule within the rules listed in table 508. The row position within table 508 may be significant as such position may determine the order in which the rules are applied on a network device. For example, if table 508 includes nrules, then the rules may be renamed as follows: Rule1, Rule2, Rule3 . . . Rulen.

Rule table 508 includes a plurality of columns, each column having one of the column headings 510. Presently, table 508 does not include any rows because the ACL currently does not include any rules. Table 508 may include one or more rows, each row corresponding to a rule, for example, as shown in screen shot 900 of FIG. 9. A user may select the row using any of a variety of techniques, for example, clicking on one of directional arrows 507, by scrolling down through table entries using the keyboard or mouse or by clicking on one of the rows of the table.

After the user has selected a row, the user may edit the row. The user may initiate the editing of the row using any of a variety of techniques, for example, by clicking on or selecting the edit button 505. The user may initiate creation of a new rule using any of a variety of techniques, for example, by clicking on or selecting button 504. Clicking on or selecting button 504 may produce the screen shot 600 of FIG. 6.

In screen shot 600, the GUI 200 includes sub-task list 202 and sub-task panel 602 corresponding to the sub-task represented by item 206. Sub-task information 214, 216, 218 and 220 each may have default values defined for the sub-task represented by item 206. Information 214 indicates that the default name for the rule is "Rule1". Information 216 indicates that the default value for the action is "Permit". Information 218 indicates that the default value for the type is "IP" and information 220 indicates that the default value for logging is "No."

As can be seen by the information entered or selected by the user in fields 604, 606, 608 and 610, the default values for the name of the rule, the action to be performed by the rule and whether the rule will be logged have been overridden by the user, whereas the default value for the type of rule has been maintained.

In response to the user completing the sub-task of sub-task panel 602 and the information entered being verified, the GUI may be updated as illustrated in screen shot 201 of FIG. 2.

In GUI 200 of screen shot 201, the information 214, 216, 218, 220 of item 206 has been updated to reflect the information entered or selected by the user in sub-task panel 602. Further, information 215 from item 205 has been updated to reflect that there now is one rule defined for the ACL. Accordingly, if the user indicates the completion of the task (i.e., the creation of the ACL), for example, by clicking on or selecting button 242, the ACL would include one rule having the values for rule parameters indicated by information 214, 216, 218 and 220 displayed in item 206 and having the default values indicated by information displayed within items 208, 210 and 212.

Figure 7:
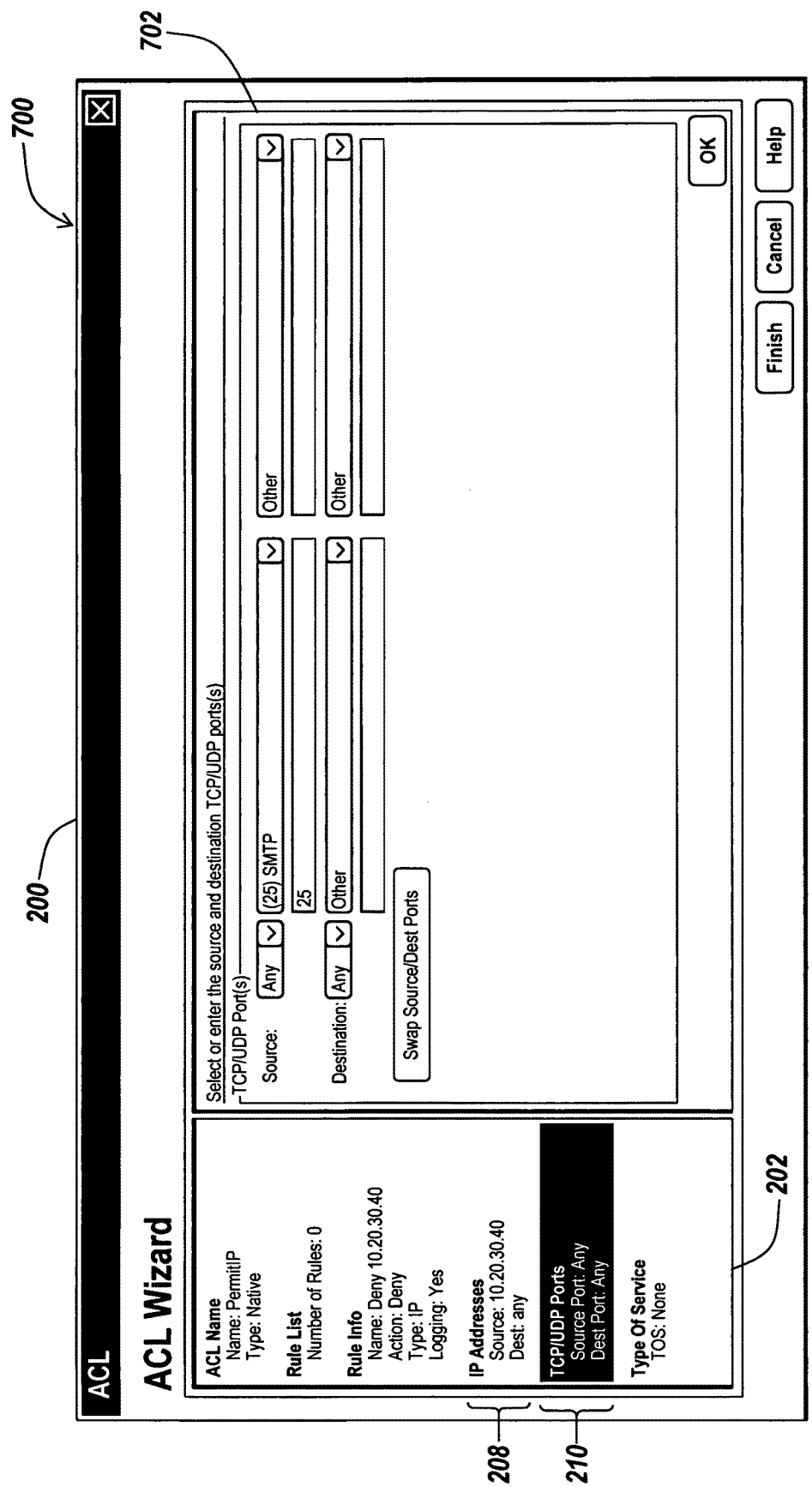

After the user has completed the sub-task of panel 204 and the information has been verified, GUI 200 may be updated as illustrated in screen shot 700 of FIG. 7.

In screen shot 700, GUI 200 includes sub-task list 202 and sub-task panel 702 corresponding to the sub-task represented by item 210 of the sub-task list 202. Information included in item 208 has been updated in accordance with the information entered by the user in 204.

Similar to the completion of other sub-tasks, the user is automatically presented sub-task panel 702 in response to completion of the task of sub-task panel 204. In this respect, the performance of method 100 or 300 to produce the GUI 200 illustrated in FIGS. 2 and 4-11 is similar to a linear wizard described above. This automatic presentation of sub-tasks in a predefined order may be desirable for a novice user with relatively little experience in performing the task (e.g., defining an ACL). However, methods 100 and 300 also may enable the user to select any item from sub-task list 202 at any time during the performance of the task of defining an ACL.

Figure 8:
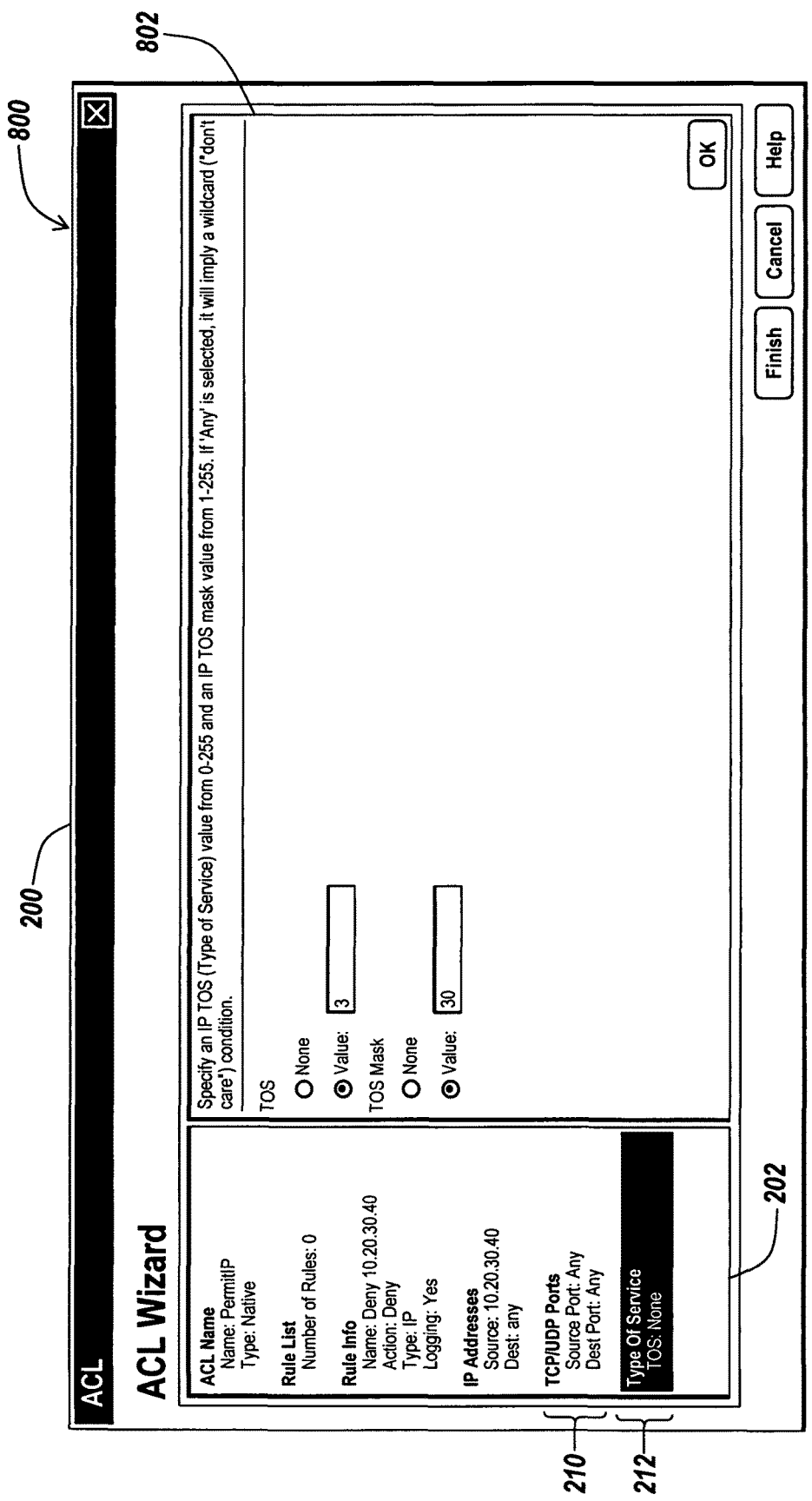
Figure 9:
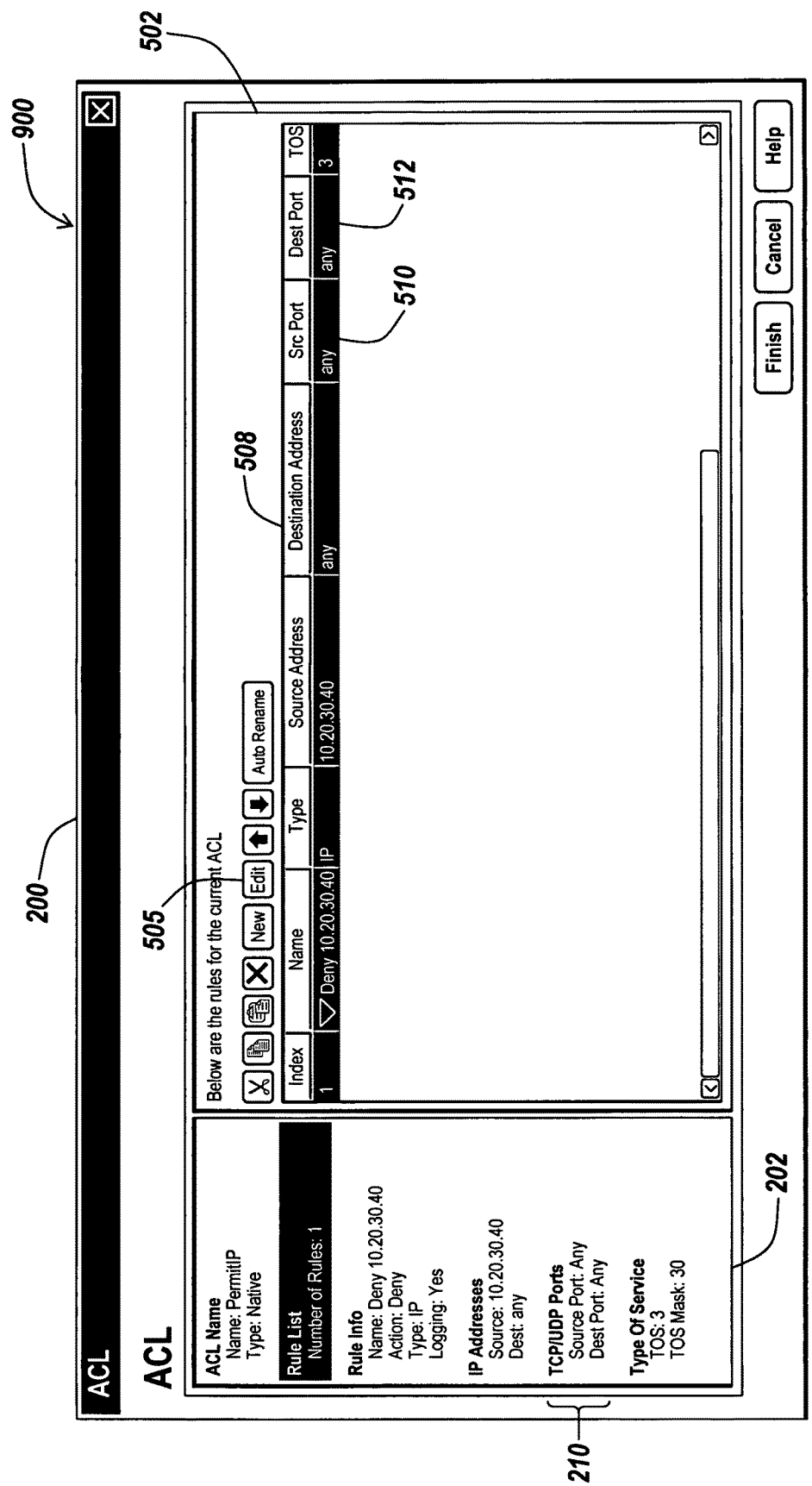
Figure 10:
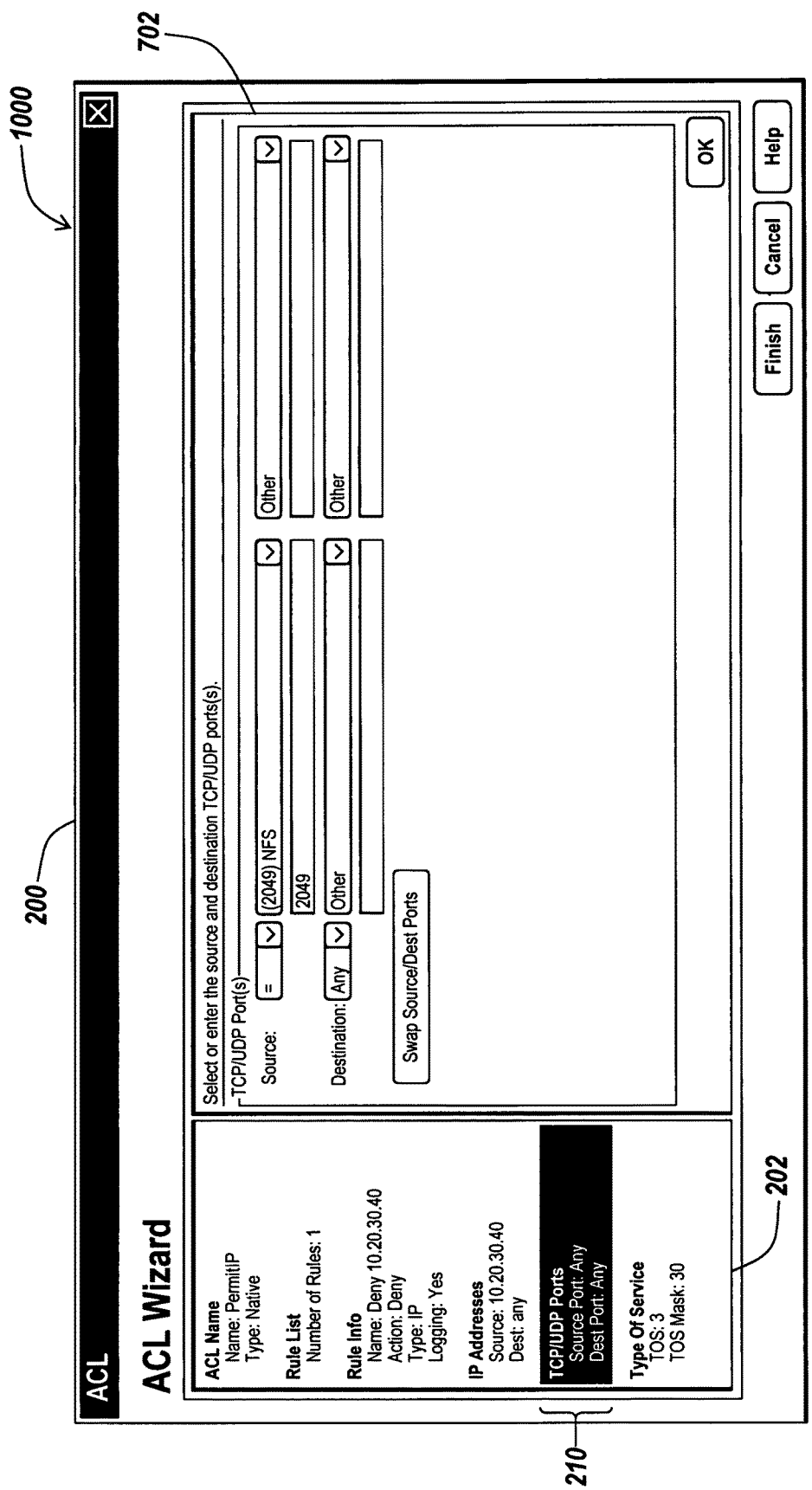
Figure 11:
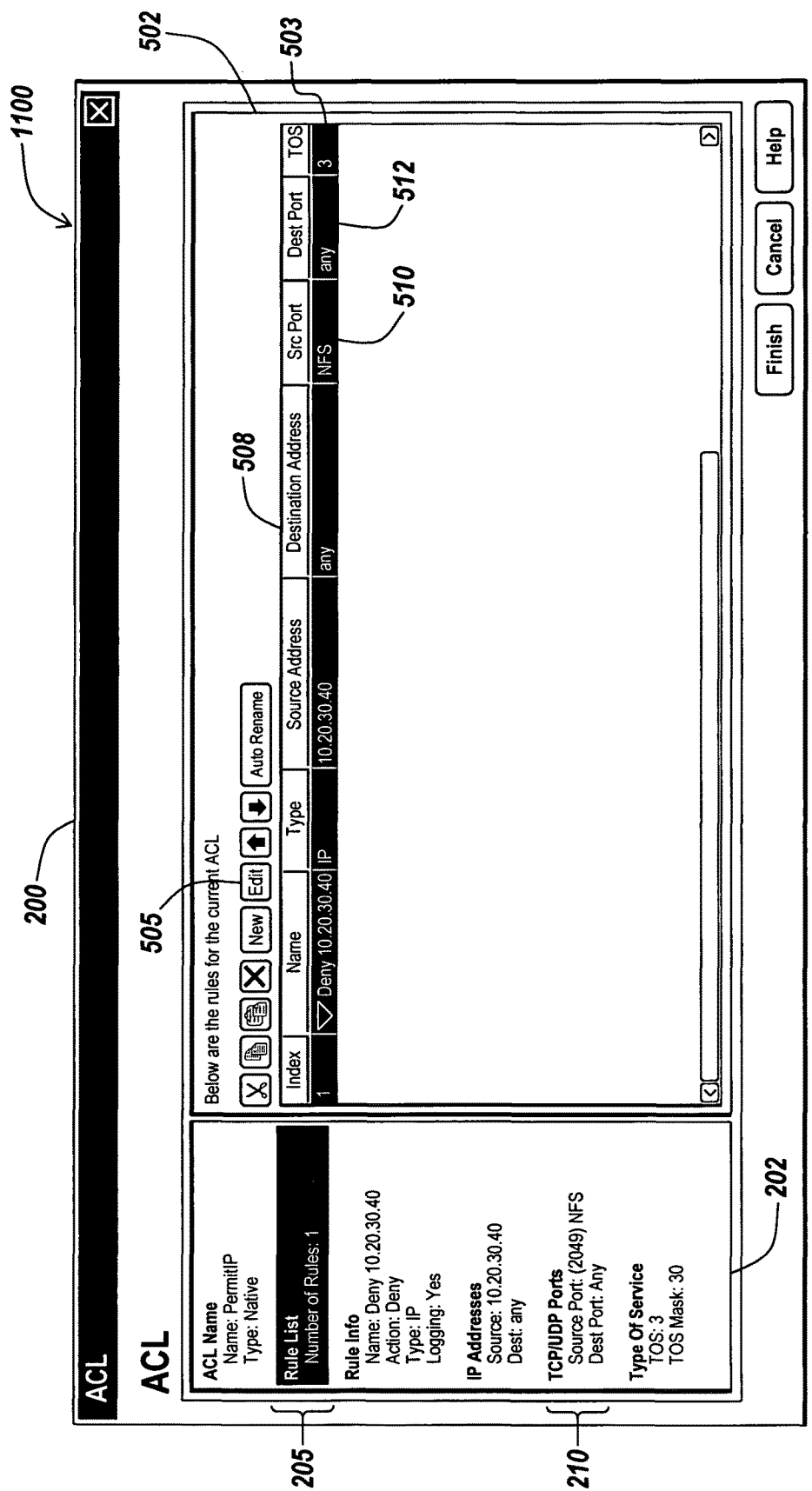

In response to the user completing the sub-task of sub-task panel 702 and the entered information being verified, the GUI 200 may be updated as illustrated in screen shot 800 of FIG. 8.

In screen shot 800, GUI 200 includes sub-task list 202 and sub-task panel 802 corresponding to the sub-task represented by item 212 of sub-task list 202. The information for item 210 was not updated with any information entered in sub-task panel 702, indicating that the user either completed the sub-task without changing any information or exited the sub-task of sub-task panel 702 without completing the sub-task, for example, by clicking on item 212 of sub-task list 202.

Although for some tasks each sub-task is performed only once, for other tasks, some sub-tasks are performed multiple times. For example, in defining an ACL, each of the sub-tasks associated with defining a rule may be performed multiple times as an ACL may include multiple rules. Accordingly, in response to the user completing the sub-task of sub-task panel 802 and the entered information being verified, GUI 200 may be updated as illustrated in screen shot 900 to return the user to sub-task panel 502 for the sub-task of editing and adding rules to the ACL, where such sub-task is represented by item 205 of sub-task list 202.

In screen shot 900, rule table 508 now includes a row 503 corresponding to the rule created as illustrated in screen shots 400-800 and 201. By double-clicking on row 503 or selecting row 503 and clicking on the edit button 505, the GUI 200 then may be updated to display a sub-task list and sub-task panel as illustrated in any of screen shots 600-800 and 201. Further, the user may be enabled to click on any of the items of task list 202 or a specific column of table 508 to be presented a specific sub-task panel corresponding to the select sub-task.

For example, the user may select item 210 or either of fields 510 or 512, in response to which GUI 200 may be updated as illustrated by screen shot 1000 to illustrate sub-task panel 702 for item 210. After the user completes the task of entering TCP/UDP port information in sub-task panel 702, and the entered information has been verified, GUI 200 may be updated as illustrated in screen shot 1100.

In screen shot 1100, GUI 200 includes sub-task panel 502 corresponding to the sub-task represented by item 205. GUI 200 also includes sub-task list 202, including item 210 that includes the updated information entered in sub-task panel 702.

GUI 200, and each rendition thereof in FIGS. 2 and 4-11, are merely illustrative embodiments of a GUI for assisting a user to navigate a task including a plurality of sub-tasks. Such illustrative embodiments are not intended to limit the scope of the invention, as any of numerous other implementations of a GUI for assisting a user to navigate a task including a plurality of sub-tasks, for example, variations of GUI 200, are possible and are intended to fall within the scope of the invention. For example, the sub-task list and sub-task panel may be located in different location of the GUI than those locations illustrated above, and the information presented and the presentation of the information presented in each of the sub-task list and the sub-task panel may vary. None of the claims set forth below are intended to be limited to any particular implementation of a GUI for assisting a user to navigate a task including a plurality of sub-tasks unless such claim includes a limitation explicitly reciting a particular implementation.

Figure 12:
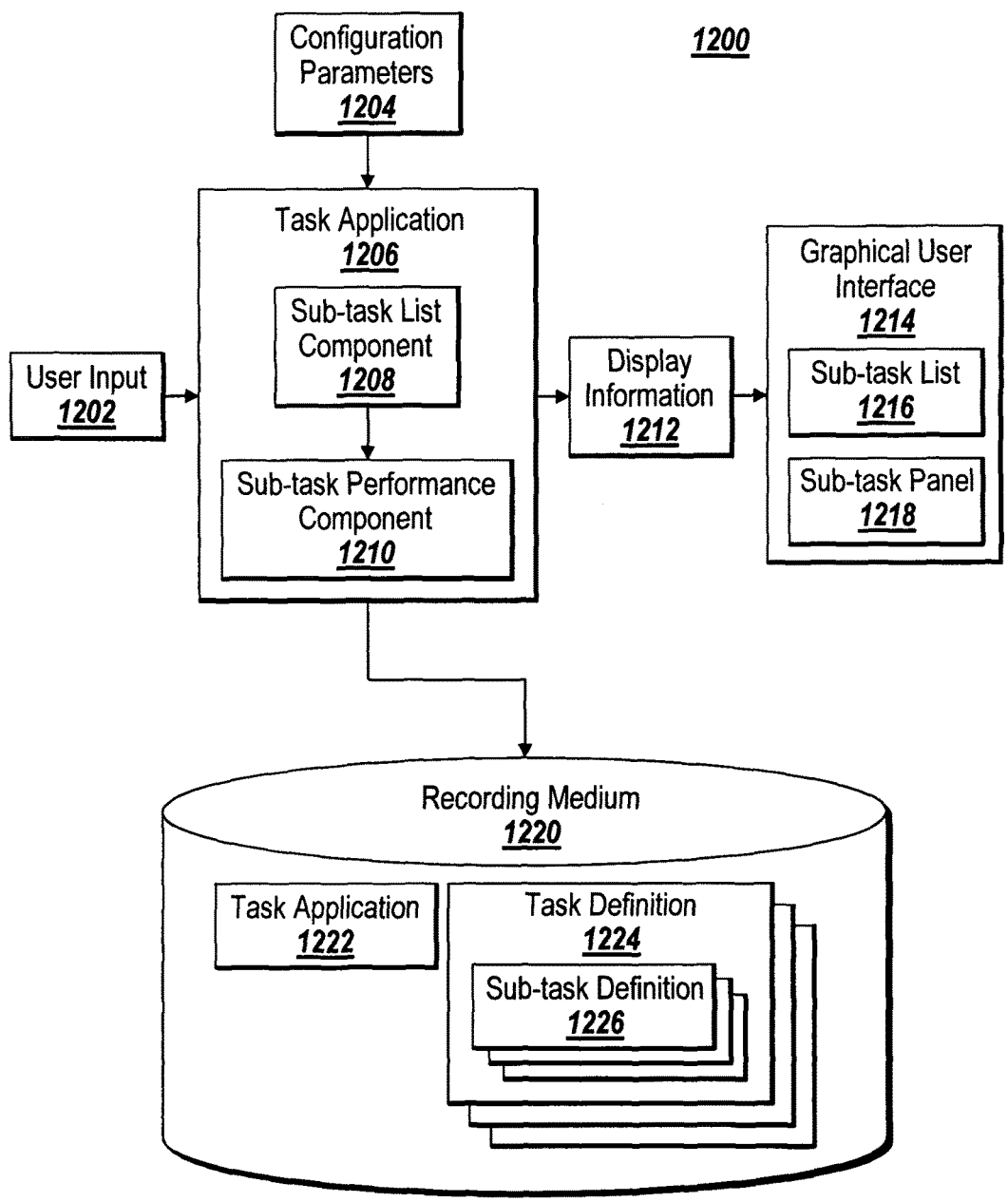
FIG. 12 is a data flow diagram illustrating an example of a system for assisting a user in navigating through performance of a task, including displaying a sub-task list of items to the user on a GUI, at least one of the items including information corresponding to a sub-task represented by the at least one item.

FIG. 12 is a data flow diagram illustrating an example of a system 1200 for assisting a user in navigating through performance of a task including a plurality of sub-tasks. Such assistance may include displaying a sub-task list of items to the user on a GUI. At least one of the items may include information corresponding to a sub-task represented by the at least one item.

System 1200 may include a task application 1206, a graphical user interface 1214 and a recording medium 1220. The task application may be configured with configuration parameters 1204, for example, by a programmer. Task application may receive user input 1202, and produce display information 1212 to send to the graphical user interface 1214.

The recording medium 1220 may store the task application 1222 and one or more task definitions 1224, each task definition including one or more sub-task definitions 1226.

In response to the task application 1206 being initialized, the stored copy of the task application 1222 may be extracted from recording medium 1220 and stored in local memory (e.g., random access memory (RAM)) until the task application is terminated. The task application may be configured to perform a task as described above in relation to method 100 and/or method 300. Further, the task application may control the graphical user interface 1214 using display information 1212 to display sub-task list 1216 and sub-task panel 1218, each of which may be any of the sub-task lists and sub-task panels, respectively, described above in relation to FIGS. 1-11.

Task application 1206 may include sub-task list component 1208 and sub-task performance component 1210. The sub-task list component 1208 may be configured to control displaying the sub-task list 1216 using display information 1212, including displaying information corresponding to sub-tasks represented by the items, for example, as described above in relation to FIGS. 1-11. The sub-task list component 1208 further may be configured to accept user input selecting a particular item from the task list and to indicate to the sub-task performance component 1210 to perform the sub-task corresponding to the selected item.

The sub-task performance component 1210 may control the display of the sub-task panel 1218 using display information 1212, for example, as described above in relation to FIGS. 1-11. The sub-task performance component 1210 may be configured to serially present sub-tasks using sub-task panel 1218 while the sub-task list displays tasks items, and may be configured to receive user input 1202 that defines information to be included for the sub-task represented in sub-task panel 1218. Further, the sub-task performance component 1210 may be configured to notify the sub-task list component to update the sub-task list based on received user input 1202. For example, in response to receiving a user input that indicates to complete a sub-task, the sub-task performance component may verify the information received for the sub-task and then notify the sub-task list component 1208 to add one or more items from the sub-task list, remove one or more items from the sub-task list and/or update the information displayed within one or more of the items of the sub-task list, e.g., as described above in relation to FIGS. 1-11.

In response to the completion of a sub-task, the sub-task performance component 1210 may save the completed sub-task as a sub-task definition 1226 of task definition 1224. Alternatively, the sub-task performance component 1210 may save sub-task definitions only after the completion of an entire task, in which case the sub-task performance component 1210 may save a task definition 1224 to recording medium 1220, where the task definition 1224 includes one or more sub-task definitions 1226.

System 1200, and components thereof, may be implemented using software (e.g., C, C#, C++, Java, or a combination thereof), hardware (e.g., one or more application-specific integrated circuits), firmware (e.g., electrically-programmed memory) or any combination thereof. One or more of the components of system 1200 may reside on a single system, or one or more components may reside on separate, discrete systems. Further, each component may be distributed across multiple systems, and one or more of the systems may be interconnected.

Further, on each of the one or more systems that include one or more components of system 1200, each of the components may reside in one or more locations on the system. For example, different portions of the components may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 1200 may be implemented on a computer system described below in relation to FIGS. 13 and 14.

System 1200 is merely an illustrative embodiment of a system for assisting a user and navigating through performance of a task including a plurality of sub-tasks. Such an illustrative embodiment is not intended to limit the scope of the invention, as any of numerous other implementations of a system for assisting a user and navigating through performance of a task including a plurality of sub-tasks Dictaphone, for example, variations of system 1200, are possible and are intended to fall within the scope of the invention. None of the claims set forth below are intended to be limited to any particular implementation of unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to assist a user in navigating through a task including a plurality of sub-tasks according to various embodiments of the invention. Further, the software design system may be located on a single computer or may be distributed among a plurality of computers attached by a communications network. As used herein, a "network" or a "communications network" is group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

A general-purpose computer system according to one embodiment of the invention is configured to assist a user in navigating through a task including a plurality of sub-tasks. It should be appreciated that the system may perform other functions, and the invention is not limited to having any particular function or set of functions. As used herein, a "set" of items may include one or more of such items.

Figure 13:
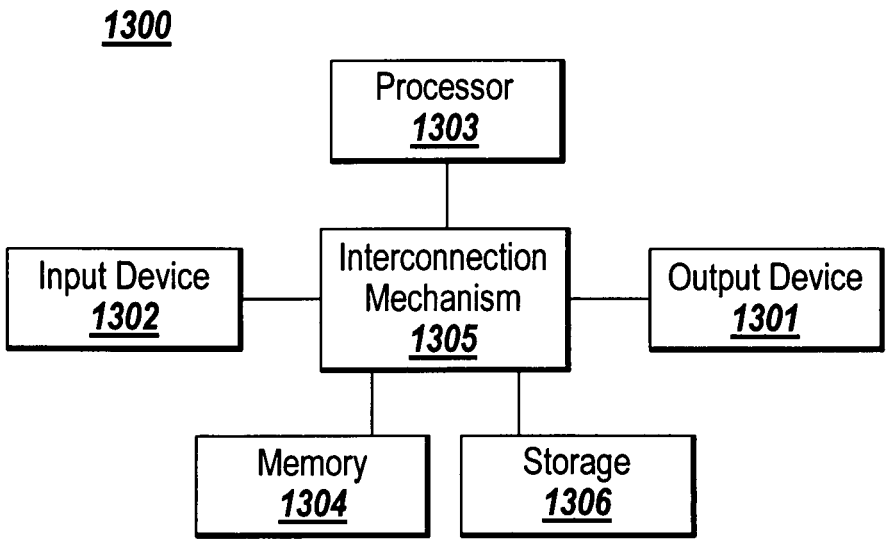
FIG. 13 is a block diagram illustrating an example of a computer system which may be used to implement aspects of the invention.

For example, various aspects of the invention may be implemented as specialized software executing in a general-purpose computer system 1300 such as that shown in FIG. 13. The computer system 1300 may include a processor 1303 connected to one or more memory devices 1304, such as a disk drive, memory, or other device for storing data. Memory 1304 is typically used for storing programs and data during operation of the computer system 1300. Components of computer system 1300 may be coupled by an interconnection mechanism 1305, which may include one or more busses (e.g., between components that are integrated within a same machine) and/or a network (e.g., between components that reside on separate discrete machines). The interconnection mechanism 1305 enables communications (e.g., data, instructions) to be exchanged between system components of system 1300. Computer system 1300 also includes one or more input devices 1302, for example, a keyboard, mouse, trackball, microphone, touch screen, and one or more output devices 1301, for example, a printing device, display screen, speaker. In addition, computer system 1300 may contain one or more interfaces (not shown) that connect computer system 1300 to a communication network (in addition or as an alternative to the interconnection mechanism 1305.

Figure 14:
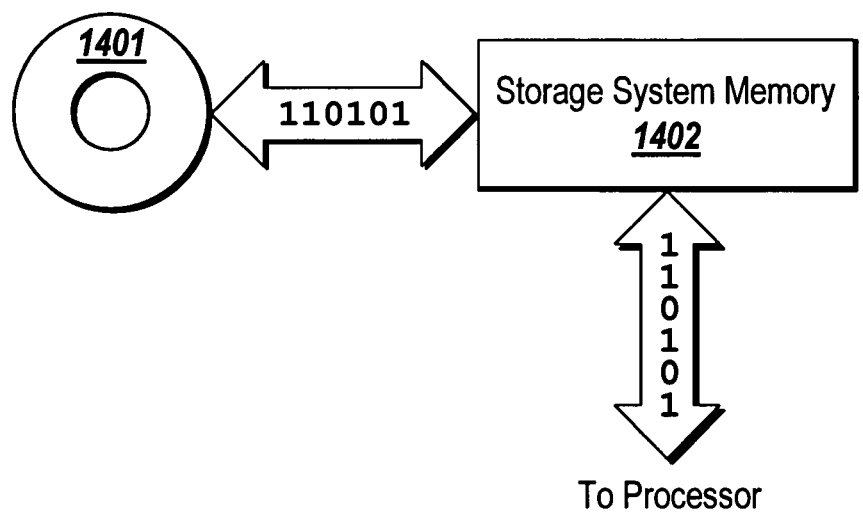
FIG. 14 is a block diagram illustrating an example of a memory system of a computer system that may be used to implement aspects of the invention.

The storage system 1306, shown in greater detail in FIG. 14, typically includes a computer readable and writeable nonvolatile recording medium 1401 in which signals are stored that define a program to be executed by the processor or information stored on or in the medium 1401 to be processed by the program. The medium may, for example, be a disk or flash memory. Typically, in operation, the processor causes data to be read from the nonvolatile recording medium 1401 into another memory 1402 that allows for faster access to the information by the processor than does the medium 1401. This memory 1402 is typically a volatile, random access memory such as a dynamic random access memory (DRAM) or static memory (SRAM). It may be located in storage system 1306, as shown, or in memory system 1304, not shown. The processor 1303 generally manipulates the data within the integrated circuit memory 1304, 1402 and then copies the data to the medium 1401 after processing is completed. A variety of mechanisms are known for managing data movement between the medium B01 and the integrated circuit memory element 1404, 1402, and the invention is not limited thereto. The invention is not limited to a particular memory system 1304 or storage system 1306.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1300 is shown by way of example as one type of computer system upon which various aspects of the invention may be practiced, it should be appreciated that aspects of the invention are not limited to being implemented on the computer system as shown in FIG. 13. Various aspects of the invention may be practiced on one or more computers having a different architecture or components that that shown in FIG. 13.

Computer system 1300 may be a general-purpose computer system that is programmable using a high-level computer programming language. Computer system 1300 may be also implemented using specially programmed, special purpose hardware. In computer system 1300, processor 1303 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computational device for assisting a user in navigating through a performance of a task, the task including a plurality of sub-tasks, the computational device comprising:
   a display device in communication with the computational device;
   a processor implemented at least partly in hardware and configured to implement:
      a graphical user interface, comprising:
         a list of two or more sub-tasks associated with the task, the list displaying on the display device for each sub-task:
            an identifier, and
            a value corresponding to a parameter, and
         two or more panels, each panel associated with a respective sub-task in the list; and
      a task performance component configured to:
         control a presentation of the two or more panels in the graphical user interface,
         for each of the two or more sub-tasks in the list, enable a user to perform the sub-task by entering information into the respective panel associated with the sub-task as the sub-task is presented,
         enable the user to perform the two or more sub-tasks in a non-linear user-selectable order that is independent of a positional order in which the two or more sub-tasks are listed in the list, wherein, after performing one sub-task in the list, the user is enabled to select and perform any of the remaining sub-tasks indicated in the list as a subsequent sub-task,
         detect information entered by the user in a panel associated with a sub-task,
         based on the information entered by the user in the panel associated with the sub-task, determine a change in a value corresponding to a parameter of another sub-task, and automatically update the list to display the changed value of the other sub-task in the graphical user interface on the display device, determine a change in a value corresponding to a parameter of the sub-task based on the information entered in the panel associated with the sub-task, dynamically determine a new additional sub-task that is required to be performed by the user to complete the task in addition to the two or more sub-tasks indicated in the list of sub-tasks, the new sub-task being determined based on the change in the value corresponding to the parameter of the sub-task, and automatically update the list of sub-tasks on the graphical user interface to display the new additional sub-task to the user in addition to the two or more sub-tasks.

2. The computational device of claim 1, wherein the list is operable, for each of the two or more sub-tasks in the list, to control a display of the information entered by the user in the respective panel of the sub-task.

3. The computational device of claim 1, wherein the list is operable to enable the user to perform the two or more sub-tasks in a temporal order in which the user selects the two or more sub-tasks from the list.

4. The computational device of claim 1, wherein the task performance component is operable to determine one or more of the sub-tasks required to perform the task based on the information entered by the user in the respective panels of at least one of the two or more sub-tasks.

5. The computational device of claim 1, the task performance component is operable, in the event that information already has been entered by the user for a first sub-task, to determine that the first sub-task is no longer to be included in the list, to control notifying the user that confirming an acceptance of the information entered in the first panel will result in the information entered for the second sub-task being discarded, and to update the list of sub-tasks to remove the first sub-task from the list.

6. The computational device of claim 1, wherein the computational device is operable to perform the task of creating one or more rules of an access control sub-task list for a network device.

7. The computational device of claim 1, wherein the list is operable to vertically orient the list on the graphical user interface.

8. The computational device of claim 1, wherein the other sub-task is located higher than the sub-task in the positional order in which the two or more sub-tasks are listed in the list.

9. The computational device of claim 1, wherein the other sub-task is located lower than the sub-task in the positional order in which the two or more sub-tasks are listed in the list.

10. A computer-implemented method of assisting a user in navigating through a performance of a task, the task including a plurality of sub-tasks, the method comprising acts of:
  (A) presenting two or more sub-tasks on a graphical user interface displayed on a display device in communication with a computational device, each of the two or more sub-tasks displayed in a respective panel;
  (B) for each of the two or more sub-tasks, enabling the user to perform the sub-task by entering information into the respective panel associated with the sub-task as the sub-task is presented;
  (C) while the two or more sub-tasks are being presented, displaying a list of the two or more sub-tasks to the user on the graphical user interface, the list displaying on the display device for each sub-task an identifier and a value corresponding to a parameter;
  (D) enabling the user to perform the two or more sub-tasks in a non-linear user-selectable order that is independent of a positional order in which the two or more sub-tasks are listed in the list, wherein, after performing one sub-task in the list, the user is enabled to select and perform any of the remaining sub-tasks indicated in the list as a subsequent sub-task;
  (E) detecting information entered by the user in a panel associated with a sub-task;
  (F) based on the information entered by the user in the panel associated with the sub-task, determining a change in a value corresponding to a parameter of another sub-task, and automatically updating the list to display the changed value of the other sub-task in the graphical user interface on the display device;
  (G) changing a value corresponding to a parameter of a sub-task based on information entered by the user in a panel associated with the sub-task;
  (H) dynamically determining a new additional sub-task that is required to be performed by the user to complete the task, the new sub-task being determined based on the change in the value corresponding to the parameter of the sub-task; and
  (I) automatically updating the list on the graphical user interface to display the new additional sub-task to the user.

11. The method of claim 10, wherein act (C) includes, for each of the two or more sub-tasks, displaying the information entered by the user in the panel associated with the sub-task.

12. The method of claim 10, further comprising:
  (J) enabling the user to perform the two or more sub-tasks in a temporal order in which the user selects the two or more sub-tasks from the list.

13. The method of claim 10, further comprising:
  (J) determining one or more of the sub-tasks required to perform the task based on information entered by the user in the respective panels of at least one of the two or more sub-tasks.

14. The method of claim 10, wherein information already has been entered by the user for a first sub-task and act (H) includes determining that the first sub-task is no longer to be included in the list, the method further comprising an act of:
  (J) notifying the user that confirming an acceptance of the information entered in the first panel will result in the information entered for the second sub-task being discarded.

15. The method of claim 10, wherein performing the task includes creating one or more rules of an access control sub-task list for a network device.

16. The method of claim 10, wherein act (C) includes vertically-orienting the list on the graphical user interface.

17. A system for assisting a user in navigating through a performance of a task, the task including a plurality of sub-tasks, the system comprising:
  a task performance component to control the presentation of two or more sub-tasks on a graphical user interface displayed on a display device in communication with a computational device, each of the two or more sub-tasks displayed in a respective panel, and to enable the user, for each of the two or more sub-tasks, to perform the sub-task by entering information into the respective panel of the sub-task as the sub-task is presented;
  a list of the two or more sub-tasks presented on the graphical user interface while the two or more sub-tasks are being presented, the list displaying on the display device for each sub-task an identifier and a value corresponding to a parameter;

means for enabling the user to perform the two or more sub-tasks in a non-linear user-selectable order that is independent of a positional order in which the two or more sub-tasks are listed in the list, wherein, after performing one sub-task in the list, the user is enabled to select and perform any of the remaining sub-tasks indicated in the list as a subsequent sub-task;

means for displaying, within at least one of the two or more sub-tasks in the list, a value corresponding to a parameter of the sub-task;

means for detecting information entered by the user in a panel associated with a sub-task;

means for determining a change in a value corresponding to a parameter of another sub-task based on the information entered by the user in the panel associated with the sub-task, and automatically updating the list to display the changed value of the other sub-task in the graphical user interface on the display device;

means for changing, for at least one of the two or more sub-tasks in the list, the value corresponding to the parameter of the sub-task displayed based on information entered by the user in a panel associated with the sub-task;

means for operating the task performance component to dynamically determine a new additional sub-task that is required to be performed by the user to complete the task, the new additional sub-task being determined based on the change in the value corresponding to the parameter of the sub-task; and means for automatically updating the list on the graphical user interface to display the new additional sub-task to the user.

18. A non-transitory computer-readable medium having computer-readable signals stored thereon that define instructions that, as a result of being executed by a computer, control the computer to perform a method of assisting a user in navigating through performance of a task, the task including a plurality of sub-tasks, the method comprising acts of:

(A) presenting two or more sub-tasks on a graphical user interface displayed on a display device in communication with a computational device, each of the two or more sub-tasks displayed in a respective panel;

(B) for each of the two or more sub-tasks, enabling the user to perform the sub-task by entering information into the respective panel associated with the sub-task as the sub-task is presented;

(C) while the two or more sub-tasks are being presented, displaying a list of the two or more sub-tasks to the user on the graphical user interface, the list displaying on the display device for each sub-task an identifier and a value corresponding to a parameter;

(D) enabling the user to perform the two or more sub-tasks in a non-linear user-selectable order that is independent of a positional order in which the two or more sub-tasks are listed in the list, wherein, after performing one sub-task in the list, the user is enabled to select and perform any of the remaining sub-tasks indicated in the list as a subsequent sub-task;

(E) detecting information entered by the user in a panel associated with a sub-task;

(F) based on the information entered by the user in the panel associated with the sub-task, determining a change in a value corresponding to a parameter of another sub-task, and automatically updating the list to display the changed value of the other sub-task in the graphical user interface on the display device;

(G) changing a value corresponding to a parameter of a sub-task based on information entered by the user in a panel associated with the sub-task;

(H) dynamically determining a new additional sub-task that is required to be performed by the user to complete the task, the new additional sub-task being determined based on the change in the value corresponding to the parameter of the sub-task; and (I) automatically updating the list on the graphical user interface to display the new additional sub-task to the user.

19. The non-transitory computer-readable medium of claim 18, wherein act (C) includes, for each of the two or more sub-tasks, displaying the information entered by the user in the panel associated with the sub-task.

20. The non-transitory computer-readable medium of claim 18, wherein the method further comprises:

(J) enabling the user to perform the two or more sub-tasks in a temporal order in which the user selects the two or more sub-tasks from the list.

21. The non-transitory computer-readable medium of claim 18, wherein the method further comprises:

(J) determining one or more of the sub-tasks required to perform the task based on information entered by the user in the respective panels of at least one of the two or more sub-tasks.

22. The non-transitory computer-readable medium of claim 18, wherein information already has been entered by the user for a first sub-task and act (H) includes determining that the first sub-task is no longer to be included in the list, the method further comprising an act of:

(J) notifying the user that confirming an acceptance of the information entered in the first panel will result in the information entered for the second sub-task being discarded.

23. The non-transitory computer-readable medium of claim 18, wherein performing the task includes creating one or more rules of an access control sub-task list for a network device.

24. The non-transitory computer-readable medium of claim 18, wherein act (C) includes vertically-orienting the list on the graphical user interface.

* * * * *